United States Patent
Omori et al.

(10) Patent No.: US 7,287,262 B2
(45) Date of Patent: Oct. 23, 2007

(54) DISC DRIVE APPARATUS, DISC DRIVE UNIT AND OPTICAL PICKUP DEVICE

(75) Inventors: Kiyoshi Omori, Tokyo (JP); Satoshi Muto, Chiba (JP)

(73) Assignee: Sony Corporation (JP)

( * ) Notice: Subject to any disclaimer, the term of this patent is extended or adjusted under 35 U.S.C. 154(b) by 324 days.

(21) Appl. No.: 11/137,443

(22) Filed: May 26, 2005

(65) Prior Publication Data

US 2005/0270915 A1    Dec. 8, 2005

(30) Foreign Application Priority Data

Jun. 4, 2004    (JP)    ............................. 2004-167552

(51) Int. Cl.
G11B 33/12    (2006.01)
(52) U.S. Cl. ................................................. 720/652
(58) Field of Classification Search ................ 720/652, 720/654, 601, 603, 649
See application file for complete search history.

(56) References Cited

U.S. PATENT DOCUMENTS

2005/0289575 A1*   12/2005  Makara et al.  .............. 720/652
2006/0041897 A1*    2/2006  Takahashi et al.  .......... 720/652

* cited by examiner

Primary Examiner—Allen Cao
(74) Attorney, Agent, or Firm—Rader Fishman & Grauer PLLC; Ronald P. Kananen

(57) ABSTRACT

The present invention provides a disc drive apparatus that can effectively prevent the part of the flexible printed circuit board that cannot be covered by the top cover from coming out to the outside through the aperture of the top cover when the flexible printed circuit board displaces its folded position, following the movement of the optical pickup that is being fed. The disc drive apparatus includes a cabinet, a disc drive unit contained in the cabinet, and a circuit substrate carrying a drive control circuit for controlling the operation of driving the disc drive unit. The disc drive unit includes a disc rotary drive mechanism, an optical pickup, a pickup feed mechanism, a base, a flexible printed circuit board, and a top cover. The disc drive unit is structurally so adapted as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

9 Claims, 23 Drawing Sheets

DISC DRIVE APPARATUS, DISC DRIVE UNIT AND OPTICAL PICKUP DEVICE

CROSS REFERENCE TO RELATED APPLICATIONS

The present invention contains subject matter related to Japanese Patent Application JP 2004-167552 filed in the Japanese Patent Office on Jun. 4, 2004, the entire contents of which are incorporated herein by reference.

BACKGROUND OF THE INVENTION

1. Field of the Invention

This invention relates to a disc drive apparatus for recording information signals on and/or reproducing information signals from an optical disc or a magneto-optical disc, a disc drive unit to be mounted in such a disc drive apparatus and an optical pickup device to be mounted in such a disc drive unit.

2. Description of the Related Art

Optical discs, such as CD (compact discs) and DVD (digital versatile discs), are popularly known, and disc drive apparatuses of various different types have been marketed to accommodate such optical discs.

FIG. 1 of the accompanying drawings illustrates schematically a low-profile disc drive apparatus 200 to be mounted in a host appliance that may typically be a notebook type personal computer. The disc drive apparatus 200 comprises a disc tray 202 adapted to be horizontally moved into and out of a cabinet 201 and a disc drive unit 203 mounted on the disc tray 202. Note that, in FIG. 1, the top plate of the cabinet 201 is removed for the purpose of easy viewing.

As shown in FIG. 2, the disc drive unit 203 comprises a disc rotary drive mechanism 204 for driving an optical disc to rotate, an optical pickup 205 for writing signals on or reading signals from the optical disc being driven to rotate by the disc rotary drive mechanism 204, a pickup feed mechanism 206 for feeding the optical pickup 205 in a radial direction of the optical disc, a flexible printed circuit board (to be referred to as FPC hereinafter) 207 that is connected to the optical pickup 205 at an end thereof and folded back toward the bottom surface side of the optical pickup 205 at the other end thereof and a circuit substrate 208 connected to the FPC 207 at the other end of the FPC 207. The above listed components are integrally fitted to a base 209 to realize a super-low-profile structure.

The disc rotary drive mechanism 204 includes a flat spindle motor 211 provided on the top surface thereof with a turntable 210 for receiving an optical disc. The spindle motor 211 is supported by the circuit substrate 208 and adapted to drive the optical disc received by the turntable 210 to rotate.

The optical pickup 205 includes an objective lens 205a for converging the light beam emitted from a semiconductor laser and irradiating the signal recording surface of the optical disc with the converged light beam so as to write a signal onto or read a signal from the optical disc by detecting the returning light beam reflected by the signal recording surface of the optical disc by means of a photo-detector (not shown).

The pickup feed mechanism 206 includes a pair of guide shafts 212a, 212b for movably supporting the optical pickup 205 so as to move the optical pickup 205 in a radial direction of the optical disc, a rack member 213 fitted to the optical pickup 205, a lead screw 214 to be engaged with the rack member 213 and a stepping motor 215 for driving the lead screw 214 to rotate. As the stepping motor 215 drives the lead screw 214 to rotate, the lead screw 214 and the rack member 213 that are engaged with each other by turning drive the optical pickup 205 to move from the outer periphery to the inner periphery of the optical disc or vice versa.

The FPC 207 includes a wiring section 207b connected to the optical pickup 205 and another wiring section 207c connected to the circuit substrate 208, the wiring section 207b and the wiring section 207c being arranged oppositely relative to the folded position 207a of the FPC 207 so as to be held in parallel with each other in the direction of feeding the optical pickup 205 between the optical pickup 205 and the circuit substrate 208. Thus, the FPC 207 is adapted to displace its folded position 207a when the optical pickup 205 is fed in a radial direction of the optical disc, while keeping the wiring section 207b connected to the optical pickup 205 and the wiring section 207c connected to the circuit substrate 208 in the state where they are disposed oppositely relative to the folded position 207a and held in parallel with each other in the direction of feeding the optical pickup 205.

The circuit substrate 208 is a so-called rigid substrate that carries thereon the connector 216 connected to the other end of the above described FPC 207, another connector 217 for electrically connecting the cabinet 201 and another circuit substrate arranged on the disc tray 202 and a drive control circuit (not shown) for controlling the operation of the disc drive unit 203 for driving various related components of the disc drive unit 203.

The base 209 is a piece of metal plate formed by punching to show a predetermined contour. It has a table exposing aperture 218a for exposing the turntable 210 to the outside and a pickup exposing aperture 218b for exposing the optical pickup 205 to the outside that are formed so as to be continued from each other as viewed from one of the main surface sides of the base 209. The circuit substrate 208, the pair of guide shafts 212a, 212b, the lead screw 214 and the stepping motor 215, which are described above, are fitted to the other main surface side of the base 209 along with some other components.

The disc drive unit 203 having the above described configuration is then fitted to the bottom surface of the disc tray 202 as shown in FIG. 1. A disc holding recess 219 having a profile corresponding to that of the optical disc and an aperture 220 for exposing the disc drive unit 203 to the outside through the bottom of the disc holding recess 219 are formed on the top surface of the disc tray 202. A top cover 221 for holding down the FPC 207, which is exposed to the outside through the above described pickup exposing aperture 218b, is fitted to the top surface section of the base 209 in the area where the base 209 is exposed to the outside through the aperture 220 of the disc tray 202. The top cover 221 is provided with a substantially rectangular aperture 222 for exposing the objective lens 205a. The aperture 222 corresponds to the movable range of the optical pickup 205 that is driven to move so as to be fed in a radial direction of the optical disc. On the other hand, a bottom cover 223 for covering the bottom surface side of the drive unit 203 is fitted to the bottom surface of the disc tray 202.

The disc drive apparatus 200, in which the above described disc drive unit 203 is mounted, operates to record an information signal on or reproduce an information signal from the optical disc D in a state where the disc tray 202 that holds the optical disc D is contained in the cabinet 201. More specifically, the optical pickup 205 of the disc drive unit 203 writes a signal on or reads a signal from the optical disc D, while the disc rotary drive mechanism 204 is driving the optical disc D to rotate and the pickup feed mechanism 206 is feeding the optical pickup 205 in a radial direction of the optical disc D.

Meanwhile, in the disc drive apparatus 200 showing such a low profile, the gap between the top cover 221 and the bottom cover 223, which are described above, is made very narrow as a result of reducing the height of the entire apparatus as shown in FIG. 3 so that consequently the wiring section 207b and the wiring section 207c that are folded relative to each other at the opposite side of the folded position 207a of the FPC 207 and sandwiched between the top cover 221 and the bottom cover 223 are forced to show a very reduced height.

As shown in FIGS. 1 and 3, the folded position 207a of the FPC 207 produces a raised part 207d that is raised toward the side of the top cover 221. The raised part 207d that is raised toward the top cover 221 increases the extent of rising when the FPC 207 is folded within a narrow range so that it can come out and project to the outside through the aperture 222 of the top cover 221.

Thus, in the conventional disc drive apparatus 200, the part of the FPC 207 that projects through the aperture 222 of the top cover 221 contacts the signal recording surface of the optical disc D to consequently damage the signal recording surface of the optical disc D when the optical pickup 205 is driven to move so as to be fed in a radial direction of the optical disc D.

Particularly, disc drive apparatuses 200 manufactured and marketed recently are equipped with an optical pickup 205 that is compatible with the different recording formats of different discs, including CDs and DVDs. Additionally, efforts are being mode to make the optical pickups 205 of disc drive apparatus 200 compatible with the recording format of BDs (blu-ray discs) which can highly densely record signals. Further, the FPC 207 is provided with signal lines necessary for driving and controlling the optical pickup 205 in any of the different recording formats. In other words, the FPC 207 of such a disc drive apparatus 200 carries a large number of wires that inevitably make the FPC 207 show a high profile. Then, there can arise the problem that the part of the FPC 207 that cannot be covered by the top cover 221 comes out to the outside through the aperture 222 of the top cover 221.

SUMMARY OF THE INVENTION

In view of the above-identified circumstances, it is desirable to provide a disc drive apparatus, a disc drive unit and an optical pickup device that can effectively prevent the part of the flexible printed circuit board that cannot be covered by the top cover from coming out to the outside through the aperture of the top cover when the flexible printed circuit board displaces its folded position, following the movement of the optical pickup that is being fed.

According to the present invention, there is provided a disc drive apparatus comprising: a cabinet; a disc drive unit contained in the cabinet; and a circuit substrate carrying a drive control circuit for controlling the operation of driving the disc drive unit; the disc drive unit including: a disc rotary drive mechanism having a turntable for receiving an optical disc and a spindle motor for driving the optical disc placed on the turntable to rotate; an optical pickup for writing a signal on and/or reading a signal from the optical disc, irradiating the signal recording surface of the optical disc being driven to rotate by the disc rotary drive mechanism with a light beam converged by an objective lens; a pickup feed mechanism having a guide shaft for supporting the optical pickup so as to allow it to slide in a radial direction of the optical disc and adapted to feed the optical pickup in the radial direction of the optical disc; a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof, a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc; and the disc drive unit being structurally so adapted as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

According to the present invention, there is also provided a disc drive unit comprising: a disc rotary drive mechanism having a turntable for receiving an optical disc and a spindle motor for driving the optical disc placed on the turntable to rotate; an optical pickup for writing a signal on and/or reading a signal from the optical disc, irradiating the signal recording surface of the optical disc being driven to rotate by the disc rotary drive mechanism with a light beam converged by an objective lens; a pickup feed mechanism having a guide shaft for supporting the optical pickup so as to allow it to slide in a radial direction of the optical disc and adapted to feed the optical pickup in the radial direction of the optical disc; a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof, a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc; and the disc drive unit being so adapted structurally as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

According to the present invention, there is also provided an optical pickup device comprising: an optical pickup that is fed in the radial direction of the optical disc and that writes a signal on and/or reads a signal from the optical disc, irradiating the signal recording surface of the optical disc being driven to rotate with a light beam converged by an objective lens; and a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and mounted in a disc drive unit including: a disc rotary drive mechanism having a turntable for receiving an optical disc and a spindle motor for driving the optical disc placed on the turntable to rotate; a pickup feed mechanism having a guide shaft for supporting the optical pickup so as to allow it to slide in a radial direction of the optical disc and adapted to feed the optical pickup in the radial direction of the optical disc; a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof; and a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc; and the optical pickup device being so adapted structurally as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

As described above, according to the invention, the optical pickup device is so adapted structurally as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed. Conversely, because the lateral edge section of the flexible printed circuit board that rises to a smaller extent is exposed to the aperture of the top cover, and hence the part of the flexible printed circuit board that cannot be covered by the top cover is prevented from moving out to the outside through the aperture of the top cover.

Thus, according to the present invention, if the flexible printed circuit board is made to show a relatively high profile, it is possible to prevent the part thereof that cannot be covered by the top cover from moving out to the outside through the aperture of the top cover. Therefore, the flexible printed circuit board is prevented from contacting the signal recording surface of the optical disc while the optical pickup is driven to move and fed in a radial direction of the optical disc so that it is possible for the optical pickup to properly write a signal on and/or read a signal from the optical disc. Additionally, according to the present invention, it is further possible to make the entire disc drive apparatus show a low profile, while adapting itself to a high profile flexible printed circuit board.

BRIEF DESCRIPTION OF THE DRAWINGS

FIG. 20A is a schematic perspective view, FIG. 20B is a schematic front view and FIG. 20C is a schematic lateral view;

DETAILED DESCRIPTION OF THE PREFERRED EMBODIMENTS

Now, the present invention will be described in greater detail by referring to the accompanying drawings that illustrate preferred embodiments of a disc drive apparatus, a disc drive unit and an optical pickup device according to the invention.

Figure 1:
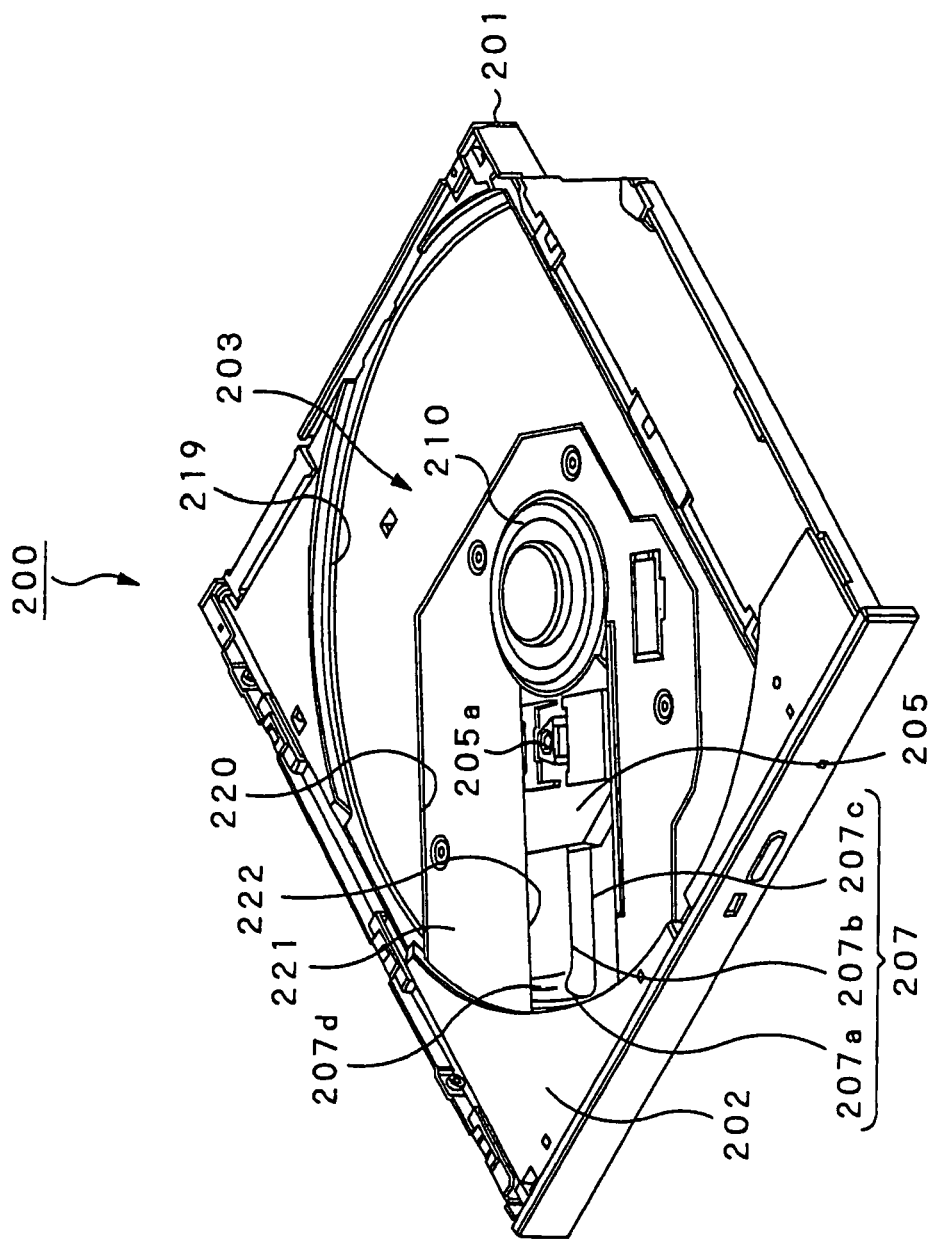
FIG. 1 is a schematic perspective view of a known disc drive apparatus without the top plate of the cabinet thereof.
Figure 2:
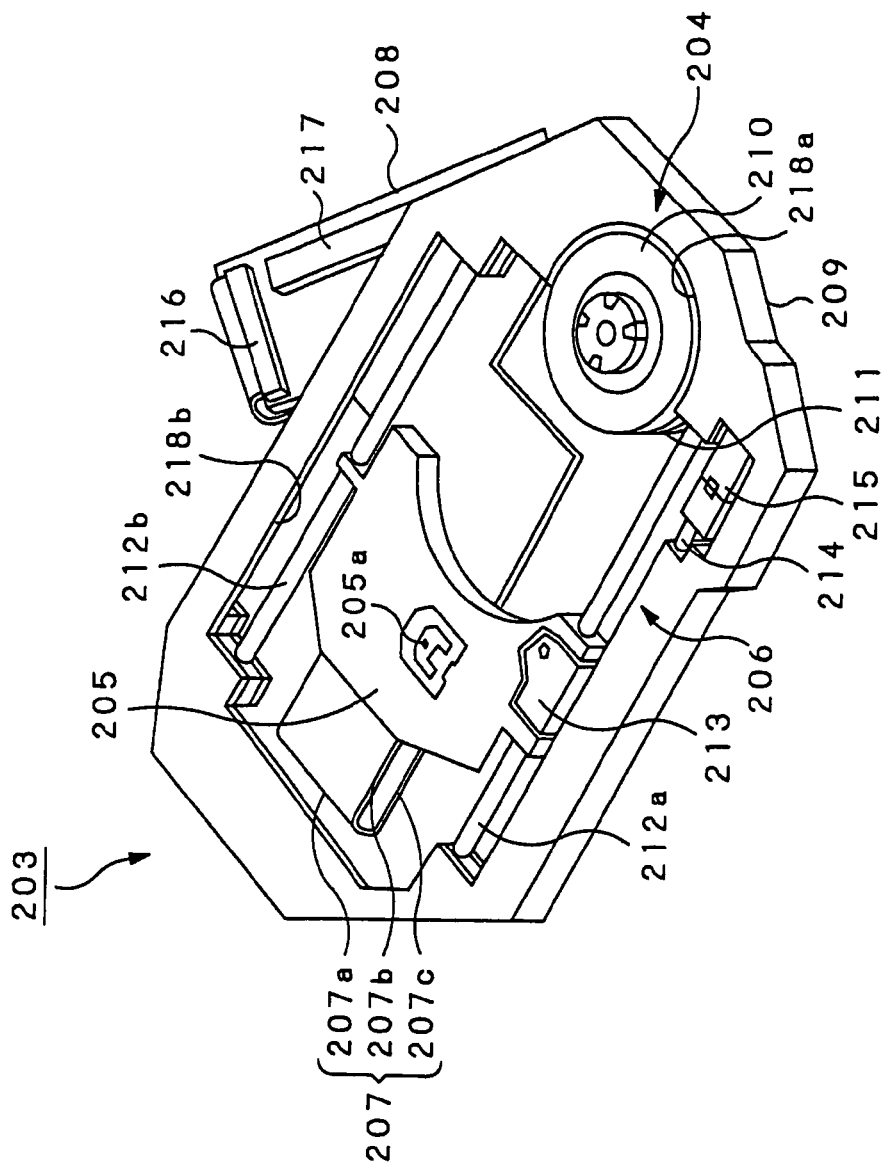
FIG. 2 is a schematic perspective view of the disc drive unit mounted in the known disc drive apparatus of FIG. 1.
Figure 3:
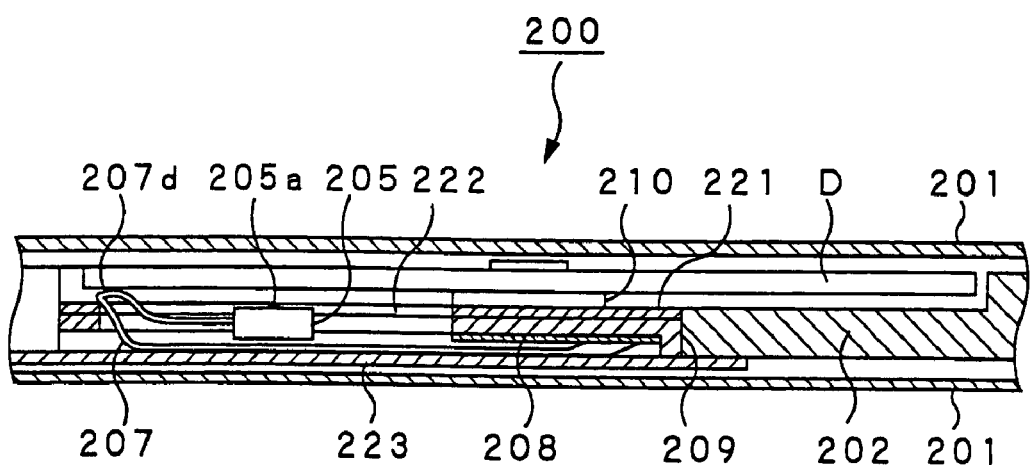
FIG. 3 is a schematic cross-sectional view of a principal part of the disc drive apparatus of FIG. 1.
Figure 4:
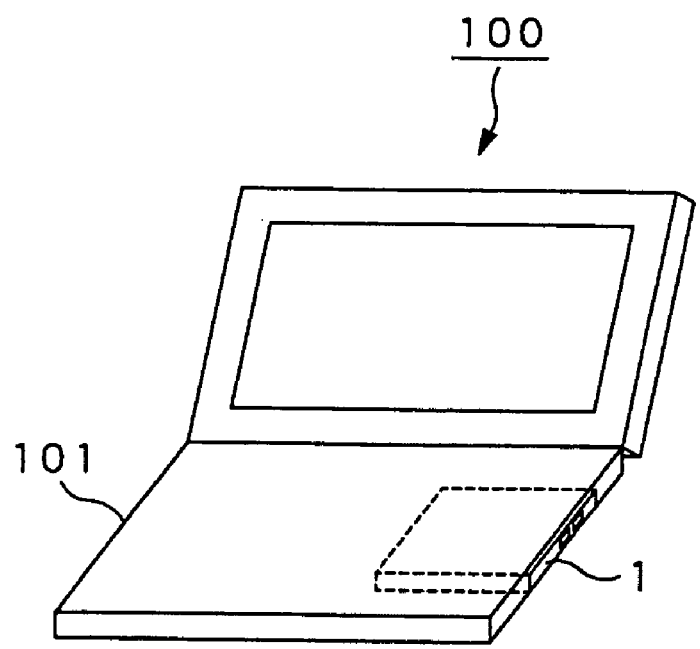
FIG. 4 is a schematic perspective view of a notebook type personal computer in which an embodiment of a disc drive apparatus according to the invention is mounted.
Figure 5:
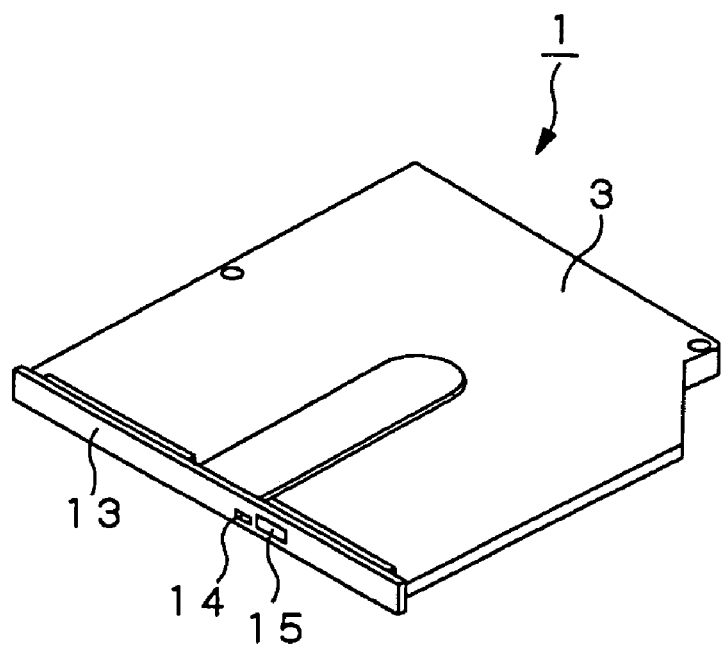
FIG. 5 is a schematic perspective view of the embodiment of the disc drive apparatus of FIG. 4 in a state where the disc tray thereof is fully contained therein.

FIG. 4 is a schematic perspective view of a notebook type personal computer 100 comprising a main body 101 in which an embodiment of a tray-type disc drive apparatus 1 according to the invention is mounted. As shown in FIG. 5, the embodiment is made to show a very low profile with a height of about 12.7 mm and adapted to record information signals on and reproduce information signals from an optical disc 2, which may be a CD (compact disc) or a DVD (digital versatile disc).

Figure 6:
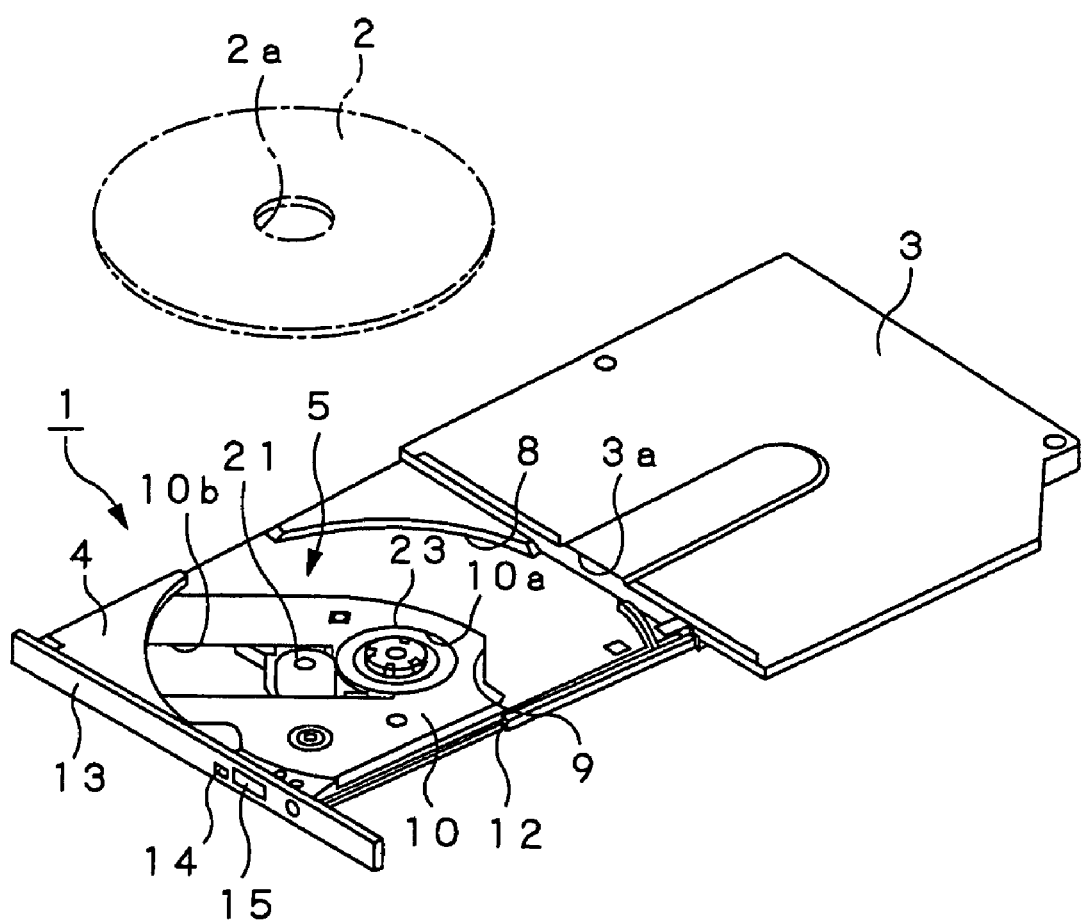
FIG. 6 is a schematic perspective view of the embodiment of the disc drive apparatus of FIG. 4 in a state where the disc tray thereof is fully drawn out from it.
Figure 7:
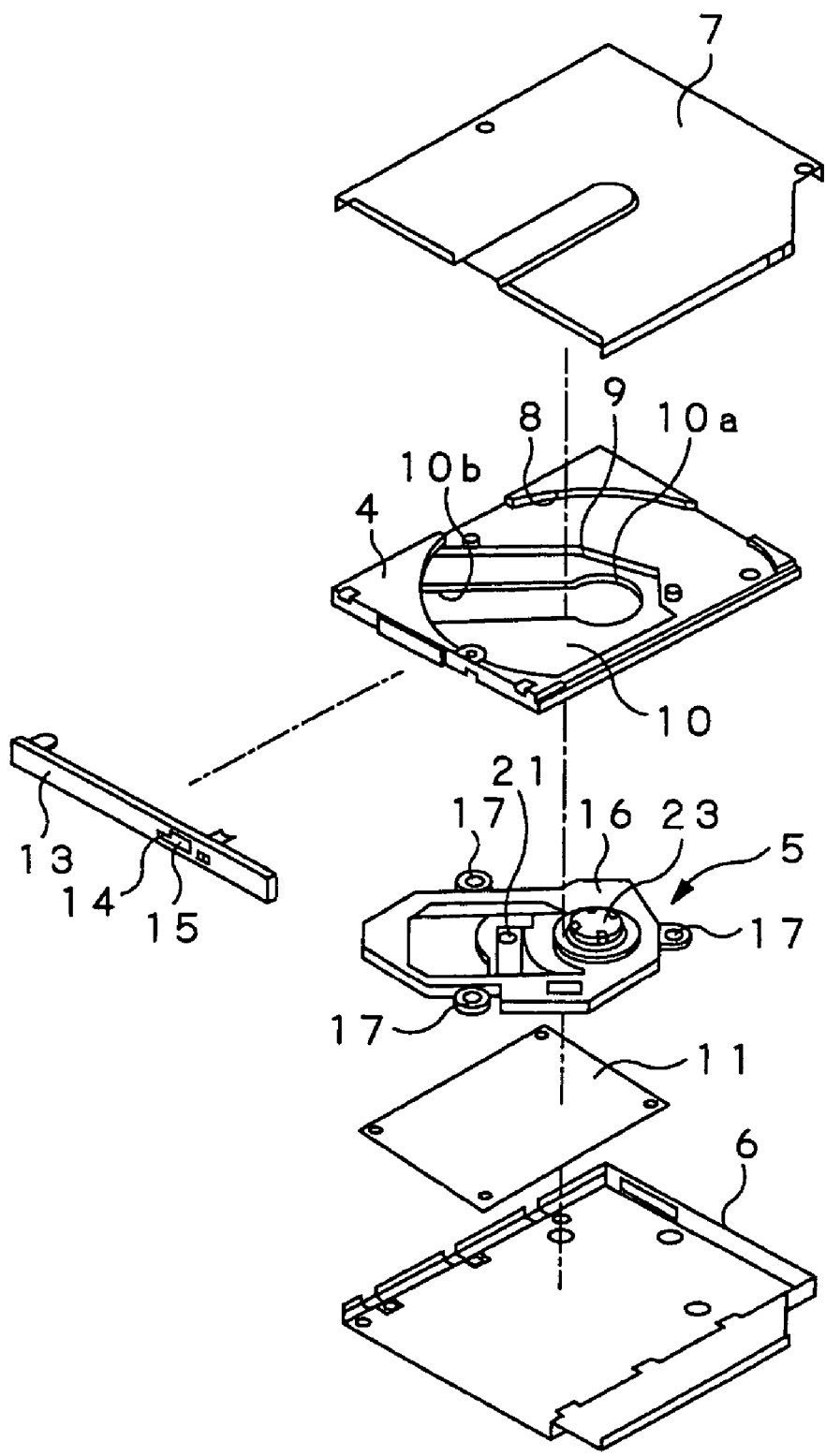
FIG. 7 is an exploded schematic perspective view of the embodiment of the disc drive apparatus of FIG. 4.

More specifically, as shown in FIGS. 6 and 7, the disc drive apparatus 1 of this embodiment comprises a cabinet 3, disc tray 4 adapted to be moved into and out from the cabinet 3 through the tray inlet/outlet port 3a formed at the front side thereof and a disc drive unit 5 fitted to the disc tray 4.

The cabinet 3 is formed by fitting a top plate 7, which is made of metal, to a lower cabinet member 6, which is also made of metal and shows a flat and substantially box-shaped profile as a whole, by means of screws so as to close the top opening of the lower cabinet member 6. Thus, a containing space for containing the disc tray 4 is defined in the inside of the cabinet 3. The front side of the cabinet 3 is open. In other words, the tray inlet/outlet port 3a is formed at the front side of the cabinet 3.

The disc tray 4 is made of a resin molding material and shows a flat and substantially rectangular profile as a whole. A disc holding recess 8 having a profile that corresponds to that of the optical disc 2 is formed on the top surface thereof. The bottom of the disc holding recess 8 is provided with an aperture 9 for exposing the disc drive unit 5 fitted to the lower surface of the disc tray 4 to the outside. A top cover 10 for holding down the FPC that is exposed to the outside through the pickup exposing aperture 19b of the base 16, which will be described in greater detail hereinafter, is fitted to the top surface of the disc drive unit 5 that is exposed to the outside through the aperture 9 of the disc tray 4. The top cover 10 is provided with a substantially semicircular aperture 10a that corresponds to the table exposing aperture 19a of the base 16, which will be described in greater detail hereinafter, and a substantially-rectangular aperture 10b for exposing the objective lens 21a and the objective lens drive mechanism 21b, which will also be described in greater detail hereinafter, that corresponds to the movable range of the optical pickup 21 that is driven to move and fed in a radial direction of the optical disc 2. The two apertures 10a and 10b continuously extend from each other. On the other hand, a bottom cover 11 is fitted to the lower surface of the disc tray to cover the bottom surface side of the disc drive unit 5.

The disc tray 4 is supported by a guide rail mechanism 12 that is arranged between an outer lateral surface thereof and the corresponding inner lateral surface of the lower cabinet member 6 so as to be able to slide between a contained position it takes when it is drawn into the inside of the cabinet 3 through the tray inlet/outlet port 3a as shown in FIG. 5, and a drawn out position it takes when it is drawn out to the outside of the cabinet 3 through the tray inlet/outlet port 3a as shown in FIG. 6.

A substantially-rectangular flat front side panel 13 is fitted to the front surface of the disc tray 4 so as to open and close the tray inlet/outlet port 3a of the cabinet 3. The front side panel 13 is provided with a display section 14 of a light that is turned on to indicate an access to the optical disc 2 and an eject button 15 to be depressed when the disc tray 4 is to be ejected.

When the disc tray 4 is contained in the cabinet 3, it is locked by a lock mechanism (not shown) and prevented from sliding to the front side of the cabinet 3. As the eject button 15 is depressed, the disc tray 4 is released from the locked state and pushed toward the front side through the tray inlet/outlet port 3a. As a result, it is possible to draw out the disc tray 4 to the drawn out position through the tray inlet/outlet port 3a. On the other hand, as the disc tray 4 is pushed into the contained position in the cabinet 3, it is locked by the lock mechanism and prevented from sliding back to the front side of the cabinet 3.

Figure 8:
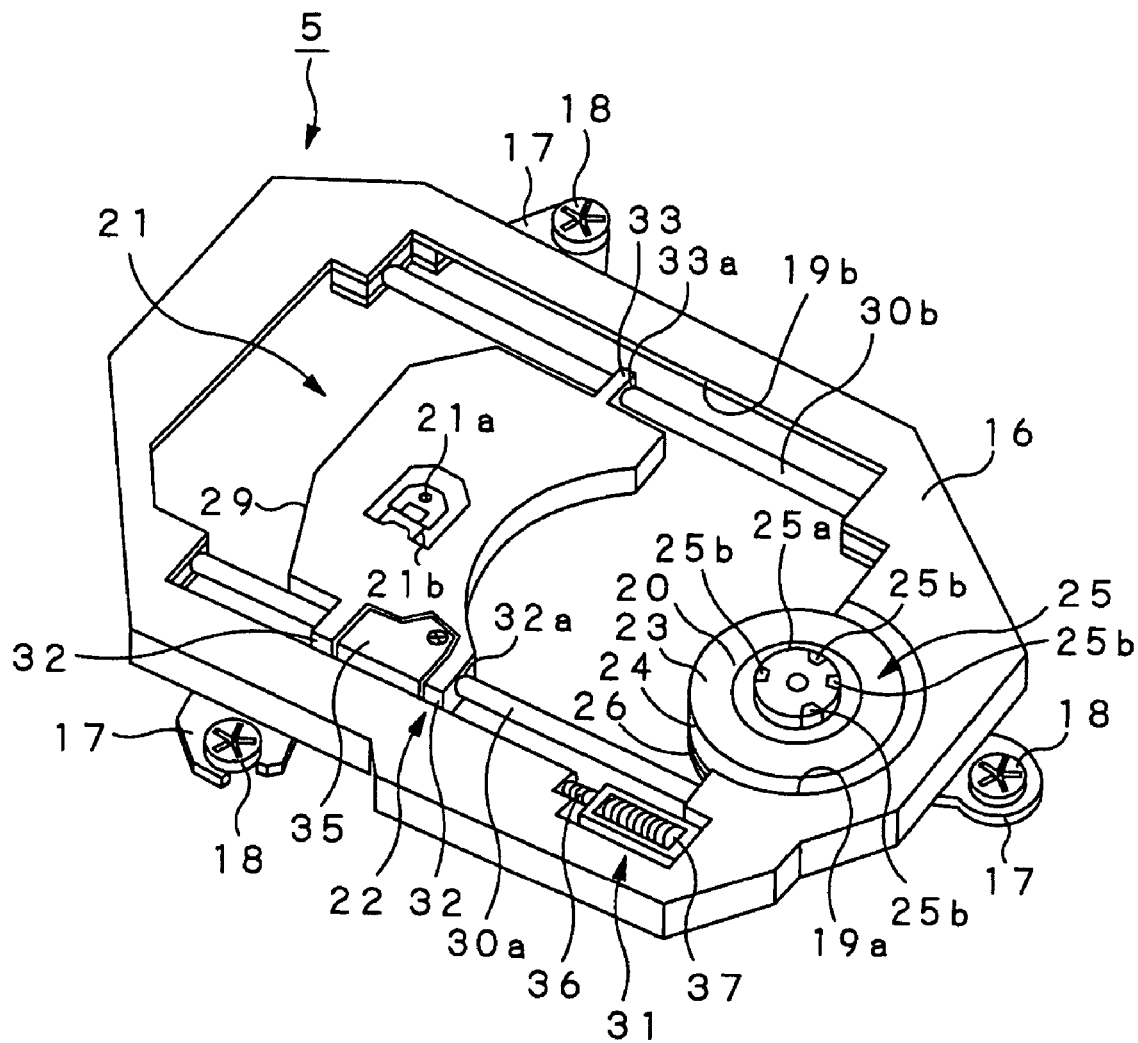
FIG. 8 is a schematic perspective view of the disc drive unit as viewed from the top surface side thereof.
Figure 9:
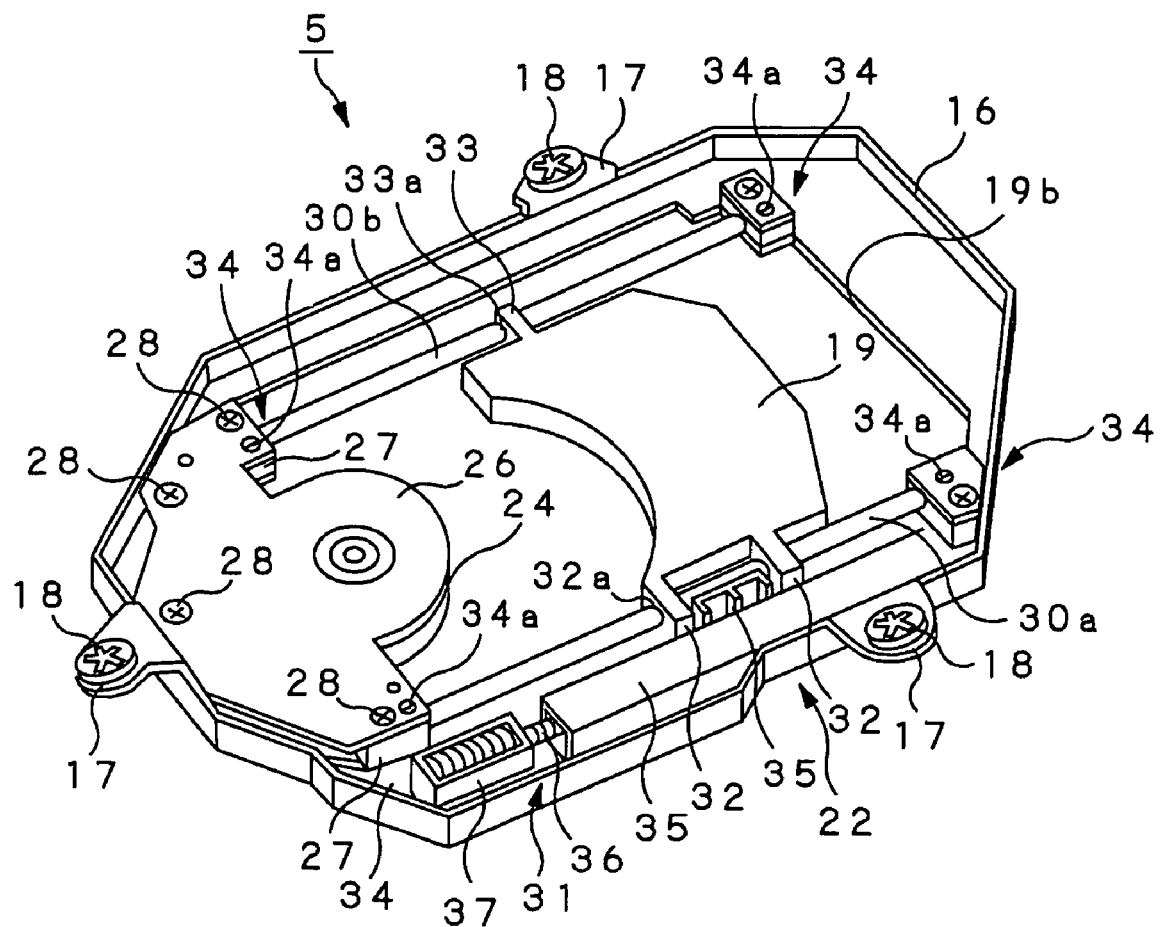
FIG. 9 is a schematic perspective view of the disc drive as viewed from the bottom surface side thereof.

As shown in FIGS. 8 and 9, the disc drive unit 5 has a base 16 formed by punching out a metal plate to a predetermined contour and bending it downward along the periphery thereof to a small extent. Three insulator fitting pieces 17 are produced by outwardly bending the downwardly-bent peripheral edge of the base 16. Insulators 18 that are made of an elastic material, such as rubber, to absorb vibrations are fitted to the respective insulator fitting pieces 17. The base 16 is supported rigidly by a spindle (not shown) arranged on the lower surface of the disc tray 4 by way of the insulators 18. The base 16 is provided on the main surface thereof with a substantially-semicircular turntable exposing aperture 19a for exposing the turntable 22, which will be described in greater detail hereinafter, and a substantially-rectangular pickup exposing aperture 19b for exposing the optical pickup 21, which is adapted to be fed in a radial direction of the optical disc 2 as will be described in greater detail hereinafter, the pickup exposing aperture 19b having a contour corresponding to the movable range of the optical pickup 21. The two apertures 19a and 19b continuously extend from each other.

The disc drive unit 5 comprises a disc rotary drive mechanism 20 for driving the optical disc 2 to rotate, an optical pickup 21 for writing signals onto and reading signals from the optical disc 2 that is driven to rotate by the disc rotary drive mechanism 20 and a pickup feed mechanism 22 for feeding the optical pickup 21 in a radial direction of the optical disc 2. The disc rotary drive mechanism 20, the optical pickup 21 and the pickup feed mechanism 22 are fitted integrally to the base 16 so as to make the disc drive unit 5 show a very low profile.

The disc rotary drive mechanism 20 has a flat spindle motor 24 arranged on the top surface section of the turntable 23 for receiving an optical disc 2. Thus, the optical disc 2 placed on the turntable 23 is driven to rotate by the spindle motor 24.

A chucking mechanism 25 is arranged at a central part of the turntable 23 for the purpose of making the loaded optical disc 2 removable. The chucking mechanism 25 has an engaging projection 25a to be engaged with the center hole 2a of the optical disc 2 and a plurality of holding claws 25b for holding the optical disc 2 around the center hole 2a thereof that is held in engagement with the engaging projection 25a. Thus, the turntable 23 centers and holds the optical disc 2.

The spindle motor 24 is supported by a circuit substrate 26, which circuit substrate 26 by turn is fitted to the bottom surface section of the base 16 by a plurality of screws 28 by way of spacers 27 in such a way that the turntable 23 slightly projects from the top surface of the base 16 through the table exposing aperture 19a.

The optical pickup 21 focuses the light beam emitted from a semiconductor laser (not shown) that operates as a light source by means of an objective lens 21a and irradiates it onto the signal recording surface of the optical disc 2. Then, it writes signals onto and/read signals from the optical disc 2 as it detects the return light beam reflected by the signal recording surface of the optical disc 2 by means of a photo-detector (not shown).

The optical pickup 21 has an objective lens drive mechanism 21b that may be typically a biaxial actuator (not shown) for driving the objective lens 21a so as to the to displace it in the direction of the optical axis of the objective lens 21 (to be referred to as focusing direction hereinafter) and also in the direction perpendicular to the recording track of the optical disc (to be referred to as the tracking direction hereinafter). The optical pickup 21 controls the operation of driving the objective lens 21a by focusing the servo of bringing the focal point of the objective lens 21 exactly onto the signal recording surface of the optical disc 2 and tracking the servo of causing the light beam focused by the objective lens 21a to follow the recording track, while displacing the objective lens 21a in the focusing direction and also in the tracking direction by means of the biaxial actuator according to the detection signal from the photo-detector that is obtained at the optical disc 2. The objective lens drive mechanism 21b may be realized alternatively by means of a triaxial actuator that can adjust and control the inclination (skew) of the objective lens 21a relative to the signal recording surface of the optical disc 2 in order to make the light beam that is converged by the objective lens 21a strike the signal recording surface of the optical disc 2 perpendicularly in addition to the focusing control and the tracking control.

The pickup feed mechanism 22 includes a pickup base 29 on which the components of the optical pickup 21 are mounted, a pair of guide shafts 30a, 30b for supporting the pickup base 29 so as to allow it to slide in a radial direction of the optical disc 2 and a displacement/drive mechanism 31 for driving and displacing the pickup base 29 supported by the pair of guide shafts 30a, 30b in the radial direction of the optical disc 2.

The pickup base 29 is arranged at a position where it is exposed to the outside through the pickup exposing aperture 19b of the base 16 and supported by the pair of guide shafts 30a, 30b so as to be able to slide. More specifically, the pickup base 29 is provided with a pair of guide pieces 32 having respective guide holes 32a, through which one of the paired guide shafts 30a, 30b, or the guide shaft 30a, passes, and another guide piece 33 through which a guide groove 33a passes for pinching the other guide shaft 30b. The pair of guide pieces 32 and the guide piece 33 project respectively from the opposite lateral sides of the pickup base 29 in opposite directions. With this arrangement, the pickup base 29 is slidably supported by the paired guide shafts 30a, 30b so that it can slide in a radial direction of the optical disc 2 in the pickup exposing aperture 19b of the base 16.

The paired guide shafts 30a, 30b are arranged on the bottom surface section of the base 16 and run in parallel with the above-described radial direction of the optical disc 2. Thus, the paired guide shafts 30a, 30b guide the pickup base 29, which is exposed through the pickup exposing aperture 19b, between the inner periphery and the outer periphery of the optical disc 2. The opposite ends of the paired guide shafts 30a, 30b are fitted to the bottom surface section of the base 16 by way of respective skew adjusting mechanisms 34.

The skew adjusting mechanisms 34 support the opposite ends of the paired guide shafts 30a, 30b so as to allow them to move in a direction perpendicular to the main surface of the base 16. Due to the arrangement of the skew adjusting mechanisms 34, it is possible to adjust the inclination of each of the guide shafts 30a, 30b to make the light beam that is converged by the objective lens 21a of the optical pickup 21 perpendicularly irradiate the signal recording surface of the optical disc 2 by means of the adjusting screws 34a of the skew adjusting mechanisms 34. It is also possible to adjust the distance between the optical pickup 21 and the signal recording surface of the optical disc 2 that is placed on the turntable 23.

Figure 10:
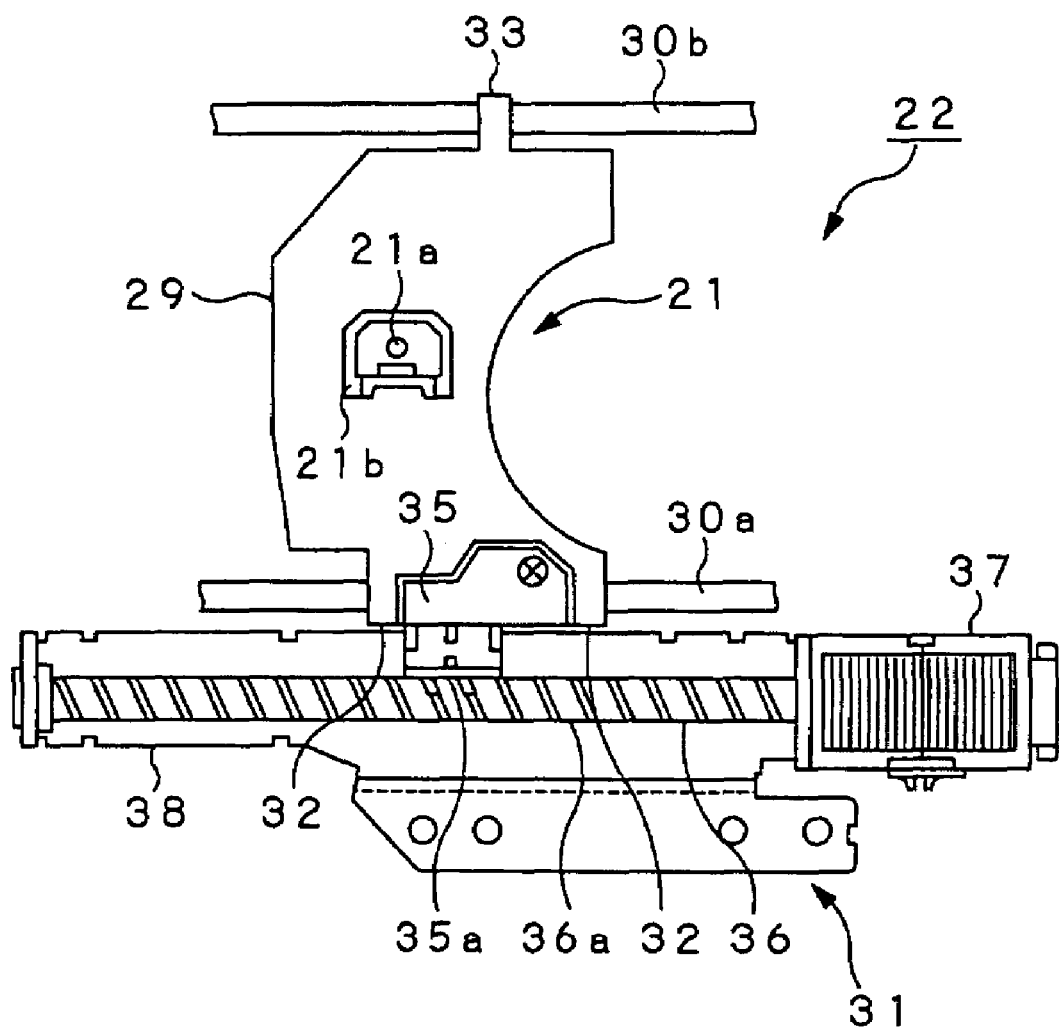
FIG. 10 is a schematic plan view of the pickup feed mechanism.

As shown in FIG. 10, the displacement/drive mechanism 31 includes a rack member 35 fitted to the pickup base 29, a feed screw 36 to be engaged with this rack member 35 and a drive motor 37 for driving the feed screw 36 to rotate.

The base side of the rack member 35 is fitted in position between the paired guide pieces 32 of the pickup base 29 by means of a screw, and is the front end side thereof integrally formed with a rack section 35a that is to be engaged with the feed screw 36 that is arranged in parallel with one of the guide shafts or the guide shaft 30a. The feed screw 36 is formed integrally with the drive shaft of the drive motor 37 and a spiral lead screw 36a to be engaged with the rack section 35a of the rack member 35 is provided on the outer peripheral surface thereof. The drive motor 37 is a so-called stepping motor that drives the feed screw 36 to rotate according to the drive pulse applied to it. The feed screw 36 and the drive motor 37 are supported by a bracket 38 that is secured to the bottom surface of the base 16 by means of screws. The bracket 38 has a profile formed by bending an oblong metal plate at the opposite ends thereof perpendicularly to a same direction, and the drive motor 37 is rigidly secured to one of the bent opposite ends with the feed screw 36 running through it. The feed screw 36 is supported at the front end thereof at the other bent opposite end of the bracket 38 and received in a bearing hole cut through the opposite end. Thus, the feed screw 36 is supported rotatably by the drive motor 37 and the other end of the bracket 38.

Thus, the displacement/drive mechanism 31 displaces and drives the pickup base 30, which is supported by the paired guide shaft 30a, 30b, in a radial direction of the optical disc 2 as the drive motor 37 drives the feed screw 36 to rotate and displaces the rack member 35 in the axial direction of the feed screw 36 due to the engagement of the lead screw 36a and the rack section 35a.

Figure 11:
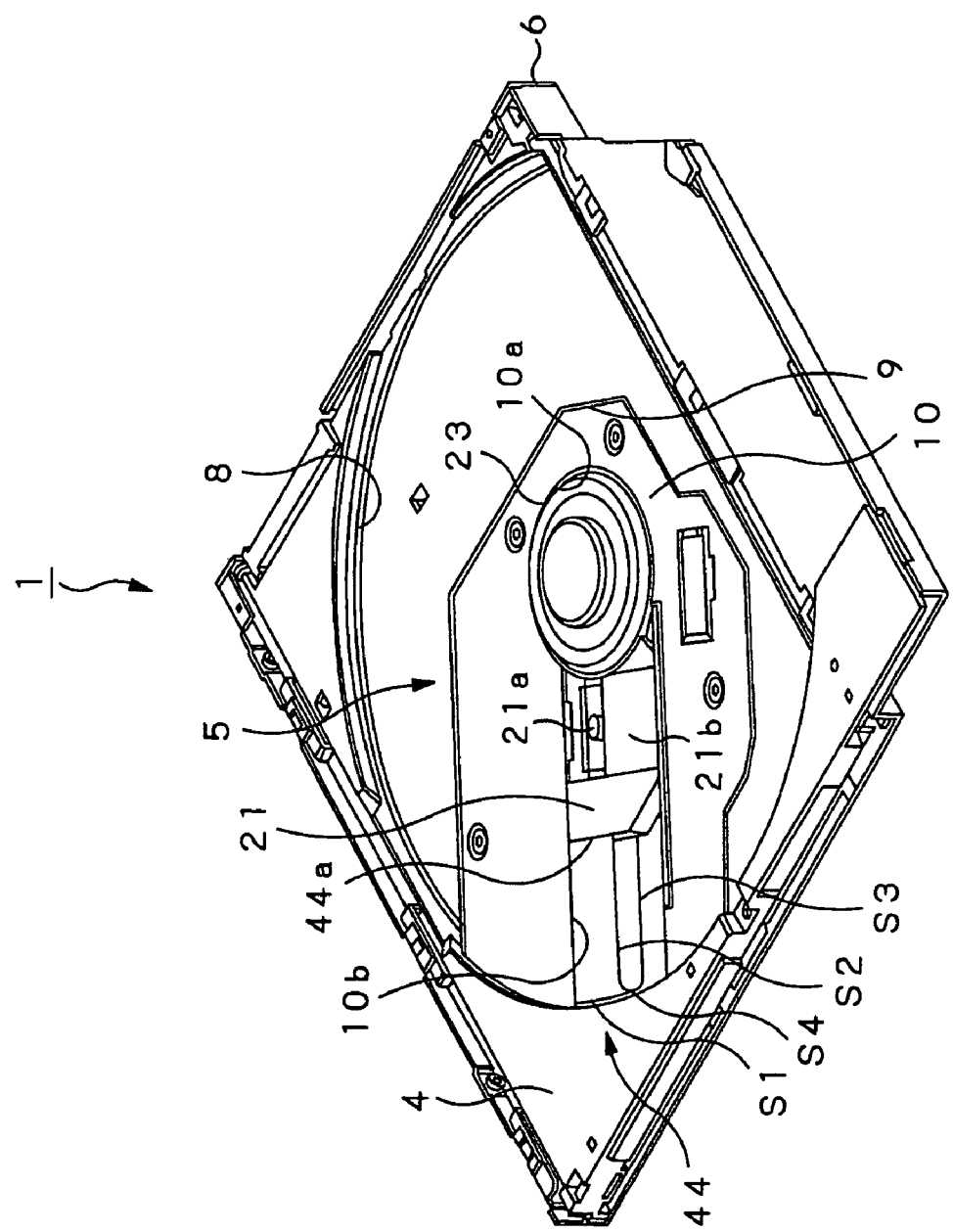
FIG. 11 is a schematic perspective view of the embodiment of the disc drive apparatus of FIG. 4 in a state where the top plate is removed from it.
Figure 12:
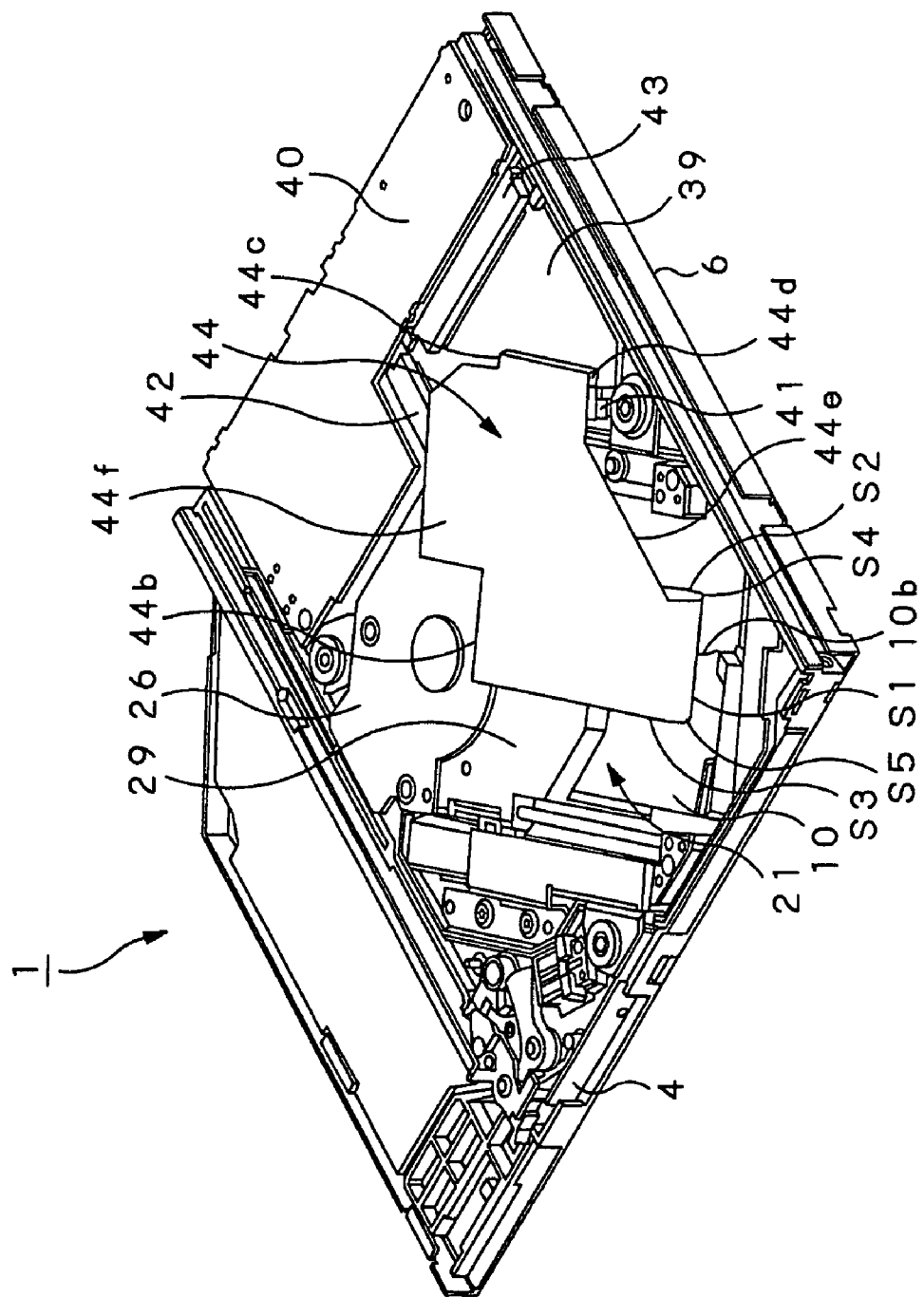
FIG. 12 is a schematic perspective view of the embodiment of the disc drive apparatus of FIG. 4 in a state where the bottom plate is removed from it.

As shown in FIGS. 11 and 12, the disc drive apparatus 1 comprises a tray side circuit substrate 30 fitted to the lower surface of the disc tray 4 and a drive main body side circuit substrate 40 fitted to the bottom surface section of the lower cabinet member 6.

Of these circuit substrates, the tray side circuit substrate 39 is provided with a connector 41 for electrically connecting itself to the optical pickup 21, a connector 42 for electrically connecting itself to the unit side circuit substrate 26 and a connector 43 for electrically connecting itself to the drive main body side circuit substrate 40. The drive control circuits (not shown) for controlling the drive operations of the spindle motor 24, the drive motor 37 and the optical pickup 21 are arranged on the oppositely-disposed main surfaces of the circuit substrate 39.

On the other hand, although not shown, the drive main body side circuit substrate 40 is provided with a connector for electrically connecting itself to the tray side circuit substrate 39 and a connector for electrically connecting itself to the apparatus main body 101. The drive control circuits (not shown) for controlling the drive operations of the components of the disc drive apparatus main body are arranged on the oppositely-disposed main surfaces of the circuit substrate 40.

The above-described unit side circuit substrate 26 that is fitted to the base 16 is remarkably downsized if compared with the corresponding conventional circuit substrate 208 described earlier by referring to FIG. 19, because the drive control circuits for controlling the drive operations of the spindle motor 24, the drive motor 37 and the components of the optical pickup 21 are mounted on the tray side circuit substrate 39 and the disc drive apparatus main body side circuit substrate 40. As a result, it is possible to make the disc drive unit 5 further compact and lightweight.

Flexible printed circuit boards (to be referred to as FPCs hereinafter) 44 are arranged between the tray side circuit substrate 39 and the optical pickup 21, between the tray side circuit substrate 39 and the unit side circuit substrate 26 and between the tray side circuit substrate 39 and the disc drive apparatus main body side circuit substrate 40 in order to electrically connect the connectors. Note that FIGS. 11 and 12 illustrate only the FPC 44 arranged between the tray side circuit substrate 39 and the optical pickup 21 for the purpose of convenience.

As the disc tray 4 that holds an optical disc 2 is contained in the cabinet 3 of the disc drive apparatus 1 having the above-described configuration and a recording or reproduction command is issued from the personal computer 100, an operation of recording or reproducing an information signal is conducted on the optical disc 2. More specifically, as the disc rotary drive mechanism 15 of the disc drive unit 5 drives the optical disc 2 to rotate and the pickup feed mechanism 18 drives the optical pickup 21 to move and feeds it in a radial direction of the optical disc 2, the optical pickup 21 writes a signal on or reads a signal from the optical disc 2.

Figure 13:
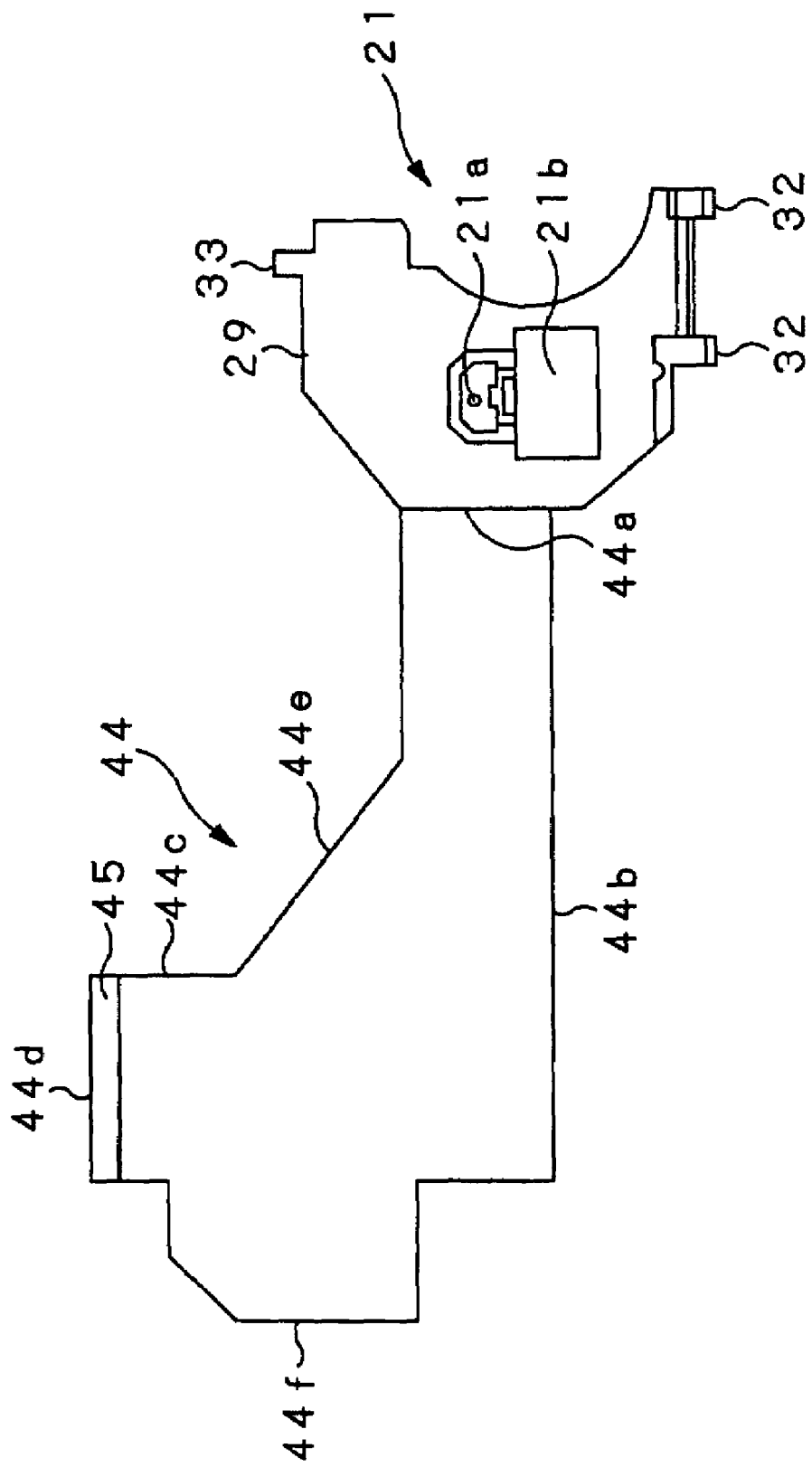
FIG. 13 is a schematic plan view of the optical pickup and one of the FPCs of the embodiment of FIG. 4, showing how the FPC is fitted to the former.

Meanwhile, the FPC 44 that is arranged between the optical pickup 21 and the tray side circuit substrate 39 typically has a profile as shown in FIG. 13.

More specifically, the FPC 44 is connected at an end 44*a* thereof to the lateral surface of the outer periphery of the optical pickup 21 and a first extended section 44*b* is extended from the end 44*a* in the direction of feeding the optical pickup 21. The first extended section 44*b* corresponds to the wiring section S2 connected to the optical pickup 21 and the wiring section S3 connected to the circuit substrate 39 with the folded position S1 of the FPC 44 interposed between them, as will be described in greater detail hereinafter and has a length that is long enough to follow the movement of the optical pickup 21.

A second extended section 44*c* is extended from one of the sides of the first extended section 44*b* that runs along the direction of feeding the optical pickup 21 in a direction perpendicular to that direction of feeding the optical pickup 21. The second extended section 44*c* leads the opposite end section 44*d* of the FPC 44 to the tray side circuit substrate 39. A terminal section 45 is arranged at the opposite end section 44*d* of the FPC 44. The terminal section 45 is to be inserted into a connector 41 arranged at the tray side circuit substrate 39.

A broad tapered section 44*e* is arranged between the first extended section 44*b* and the second extended section 44*c*. A third extended section 44*f* is extended from the side of the second extended section 44*c* that is located opposite to the optical pickup 21 in the direction of feeding the optical pickup 21. When the optical pickup 21 is located at the position closest to the outer periphery of the optical disc 2 in the direction of feeding the optical pickup 21, the third extended section 44*f* is located at a position that makes the end of the FPC 44, which is folded toward the rear side of the optical pickup 21, to be located inside relative to the inner periphery of the optical disc 2. With this arrangement, the third extended section 44*f* is located below the circuit substrate 26 to prevent the FPC 44 from being turned toward the side of the base 16 when the optical pickup 21 is fed toward the most outer peripheral part of the optical disc 2.

As shown in FIGS. 11 and 12, the first extended section 44*b* of the FPC 44 is folded toward the bottom surface side of the optical pickup 21 and the terminal section 45 of the opposite end section 44*d* is connected to the connector 41 arranged at the tray side circuit substrate 39 in a state where the FPC 44 is sandwiched between the top cover 10 fitted to the top surface section of the base 16 and the bottom cover 11 fitted to the bottom surface of the disc tray 4.

As shown in FIGS. 11 and 12, the disc drive apparatus 1 is structured so that, as the FPC 44 follows the movement of the optical pickup 21 that is being fed and the folded position S1 thereof is displaced, one of the lateral edge sections S4, S5 of the FPC 44 as viewed in the longitudinal direction of the FPC44 that is forced to rise to a great extent toward the side of the top cover 10 is held down by the top cover 10 at least at the folded position S1 thereof.

As shown in FIG. 14, when the wiring section S3 of the FPC 44 that is connected to the circuit substrate 39 and located at the side opposite to the wiring section S2 connected to the optical pickup 21 with the folded position S1 interposed between them is folded to make the FPC 44 show a V-shaped profile with an angle of θ, it is possible to increase the rise of one of the lateral edge sections S4, S5 of the FPC 44 as viewed in the longitudinal direction of the FPC 44 toward the side of the top cover 10 at the folded position S1 and conversely decrease the rise of the other lateral edge section toward the side of the top cover 10 at the folded position S1 by differentiating the turning direction of the wiring section S2 and that of the wiring section S3.

Figure 14A:
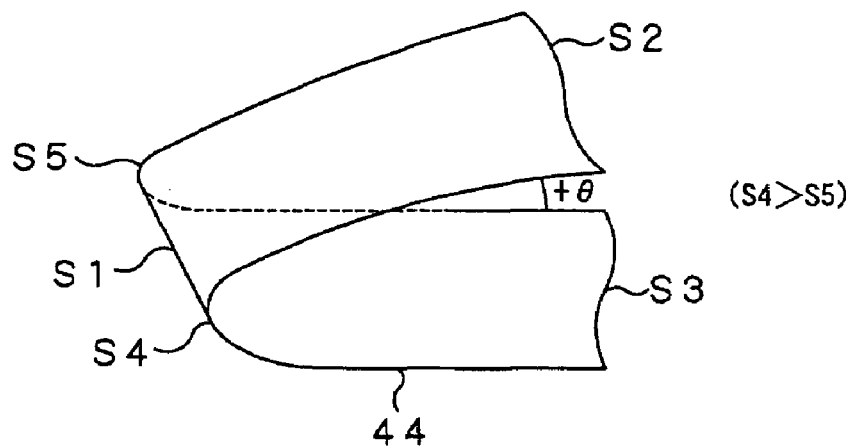
FIGS. 14A through 14C are schematic perspective views of one of the FPCs of the embodiment of FIG. 4, showing how it is raised at the folded position thereof.
Figure 14B:
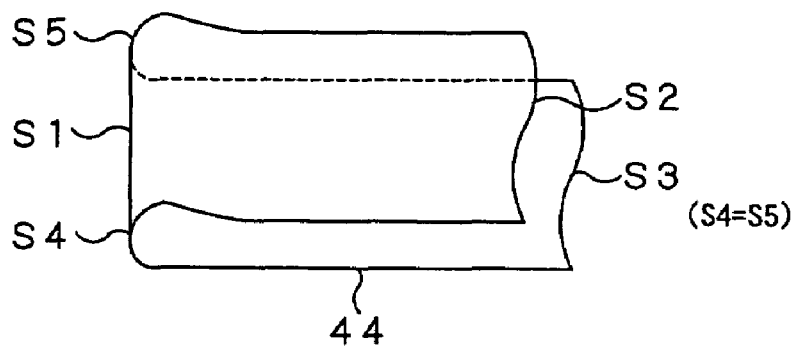

More specifically, when the FPC 44 is folded toward the bottom surface side of the optical pickup 21 in such a way that the wiring section S2 connected to the optical pickup 21 is made to run in parallel with the wiring section S3 connected to the circuit substrate 39 with the folded position S1 interposed between them (θ=0°) as shown in FIG. 14B, the rise of the lateral edge section S4 of the folded position S1 of the FPC 44 toward the side of the top cover 10 is substantially equal to that of the other lateral edge section S5.

Now, when the FPC 44 is folded toward the bottom surface side of the optical pickup 21 to show a V-shaped profile in such a way that the wiring section S3 connected to the circuit substrate 39 and running in the intra-surface direction of the base 16 is made to show an angle of +θ relative to the wiring section S2 connected to the optical pickup 21 with the folded position S1 interposed between them as shown in FIG. 14A, the rise of the lateral edge section S4 of the folded position S1 of the FPC 44 toward the side of the top cover 10 is greater than that of the other lateral edge section S5. Additionally, the rise of the lateral edge section S5 toward the side of the top cover 10 is smaller than that of the lateral edge section S5 in FIG. 14B.

Figure 14C:
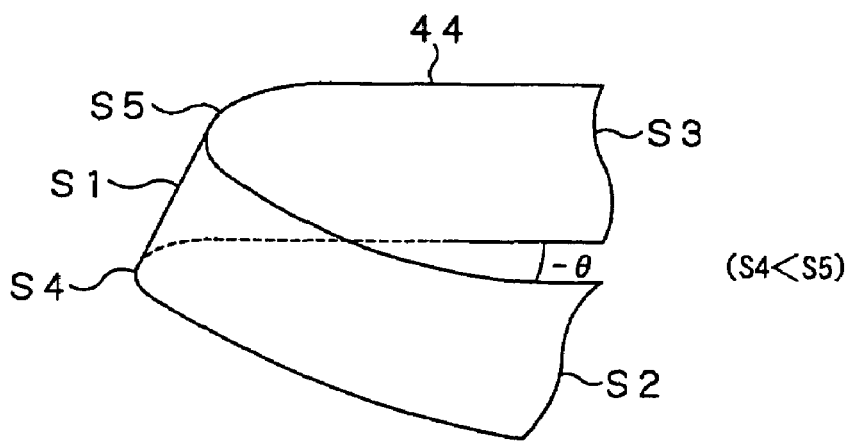

Conversely, when the FPC 44 is folded toward the bottom surface side of the optical pickup 21 in such a way that the wiring section S3 connected to the circuit substrate 39 and running in the intra-surface direction of the base 16 is made to show an angle of −θ relative to the wiring section S2 connected to the optical pickup 21 with the folded position S1 interposed between them as shown in FIG. 14C, the rise of the lateral edge section S4 of the folded position S1 of the FPC 44 toward the side of the top cover 10 is smaller than that of the other lateral edge section S5. Additionally, the rise of the lateral edge section S4 toward the side of the top cover 10 is smaller than that of the lateral edge section S4 in FIG. 14B.

Thus, in the disc drive apparatus 1 of this embodiment, as the FPC 44 follows the movement of the optical pickup 21 that is being fed and the folded position S1 thereof is displaced, if the top cover 10 is made to hold down one of the lateral edge sections S4, S5 of the FPC 44 as viewed in the longitudinal direction of the FPC 44 that is raised more than the other toward the side of the top cover 10 at least at the folded position S1 and hence the lateral edge section S5 or S4 that is raised less toward the side of the top cover 10 at the folded position S1 is exposed through the aperture 10b of the top cover 10, it is possible to prevent the lateral edge section S5 or S4, whichever is appropriate, of the FPC 44 that is not covered by the top cover 10 from going out through the aperture 10b of the top cover 10.

In the disc drive apparatus 1 of this embodiment, the FPC 44 is connected at the end 44a thereof to the lateral surface of the outer periphery of the optical pickup 21 at a position located opposite to the side where the objective lens drive mechanism 21b is arranged, as viewed along the straight line that passes through the objective lens 21a of the optical pickup 21, and runs in parallel with the direction of feeding the optical pickup 21 in order to expose the objective lens drive mechanism 21b that slightly projects from the top surface of the pickup base 29 to the outside through the aperture 10b of the top cover 10.

Thus, in the disc drive apparatus 1 of this embodiment, of the lateral edge sections S4, S5 that run along the longitudinal direction of the FPC 44, the lateral edge section S5 that rises more toward the side of the top cover 10 at the folded position S1 than the oppositely-located lateral edge section S4 that is exposed to the outside through the aperture 10b of the top cover 10 is held down by the top cover 10.

Figure 15:
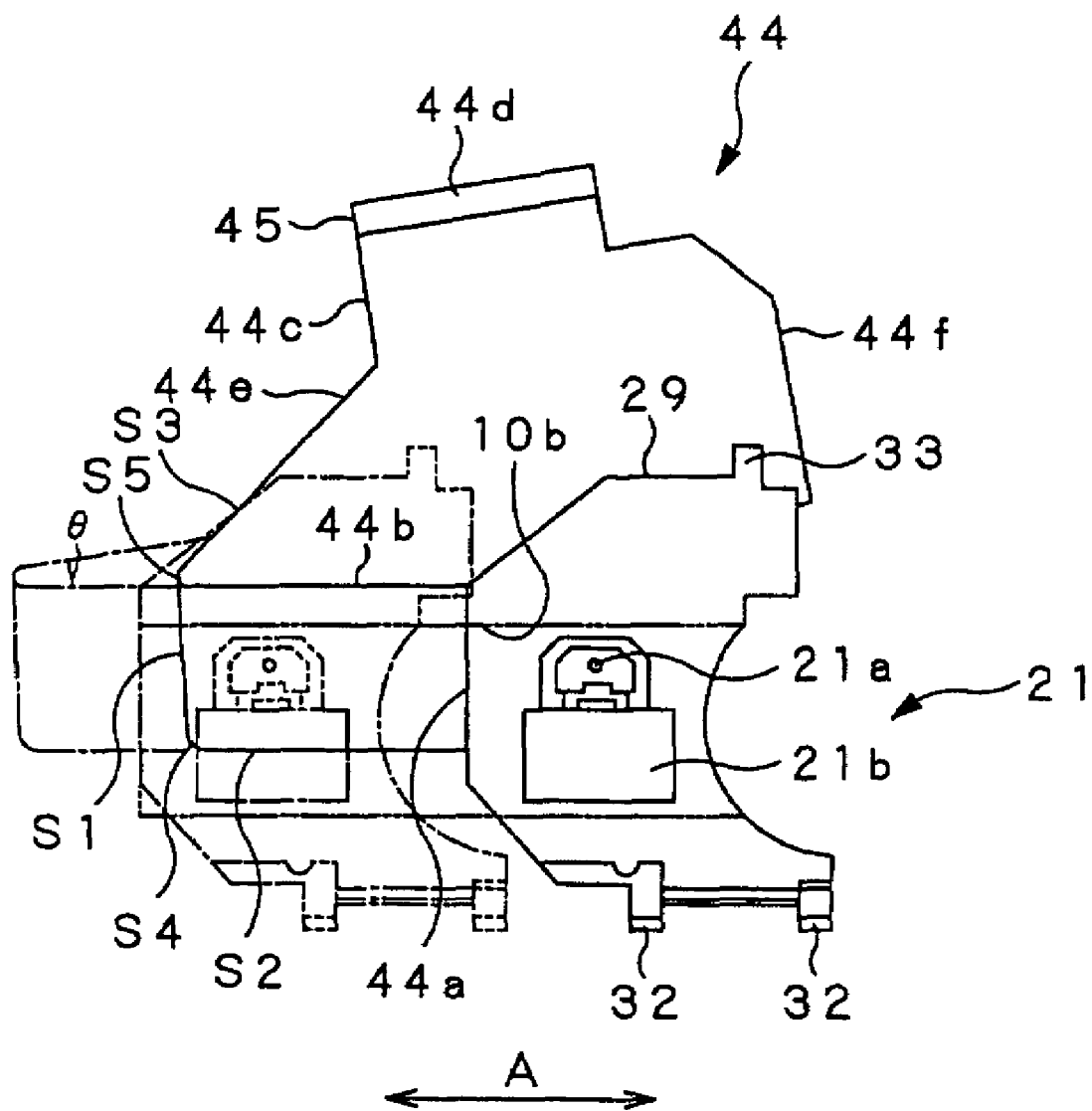
FIG. 15 is a schematic plan view of the optical pickup and the FPC of FIG. 13, showing how the FPC displaces its folded position as it follows the movement of the optical pickup that is being fed.

More specifically, as shown in FIG. 15, the FPC 44 is folded toward the bottom surface side of the optical pickup 21 to show a V-shaped profile in such a way that the wiring section S3 connected to the circuit substrate 39 and running in the intra-surface direction of the base 16 is made to show an angle of θ relative to the wiring section S2 connected to the optical pickup 21 with the folded position S1 interposed between them and the wiring section S3 is located at the side opposite to the side of the aperture 10b of the top cover 10 relative to the wiring section S2 that runs substantially in parallel with the feeding direction of the optical pickup 21.

With this arrangement, when the optical pickup 21 is located at the innermost position along the feeding direction A of the optical pickup 21 as indicated by the solid lines in FIG. 15, it is possible to place the lateral edge section that rises more toward the side of the top cover at the folded position S1, or the lateral edge section S5 of the FPC 44 at the folded position S1, below the top cover 10.

As the optical pickup 21 is driven to move and is fed from the above position to the outmost position along the feeding direction of the optical pickup 21, as indicated by broken lines in FIG. 15, the FPC 44 follows the movement of the optical pickup 21 that is being fed, and consequently the folded position S1 thereof is displaced. At this time, it is possible to place the lateral edge section that rises more toward the side of the top cover at the folded position S1, or the lateral edge section S5 of the FPC 44 at the folded position S1, below the top cover 10, while the FPC 44 keeps on being folded toward the bottom surface side of the optical pickup 21 in such a way that the wiring section S3 connected to the circuit substrate 39 and running in the intra-surface direction of the base 16 is made to show an angle of θ relative to the wiring section S2 connected to the optical pickup 21 with the folded position S1 interposed between them.

Thus, the disc drive apparatus 1 of this embodiment can be structured in such a way that, when the optical pickup 21 is driven to move and is fed in a radial direction of the optical disc 2, the top cover 10 can hold down the lateral edge section S5 that is located opposite to and raised more than the lateral edge section S4 that is exposed to the outside through the aperture 10b of the top cover 10 at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section S4 of the FPC 44 that rises less toward the side of the top cover 10 at the folded position S1.

The positional arrangement of FPC 44 relative to the optical pickup 21 in the disc drive apparatus 1 of this embodiment is not limited to the one illustrated in FIGS. 13 and 15. The FPC 44 may be arranged alternatively obliquely relative to the feeding direction of the optical pickup 21.

Figure 16:
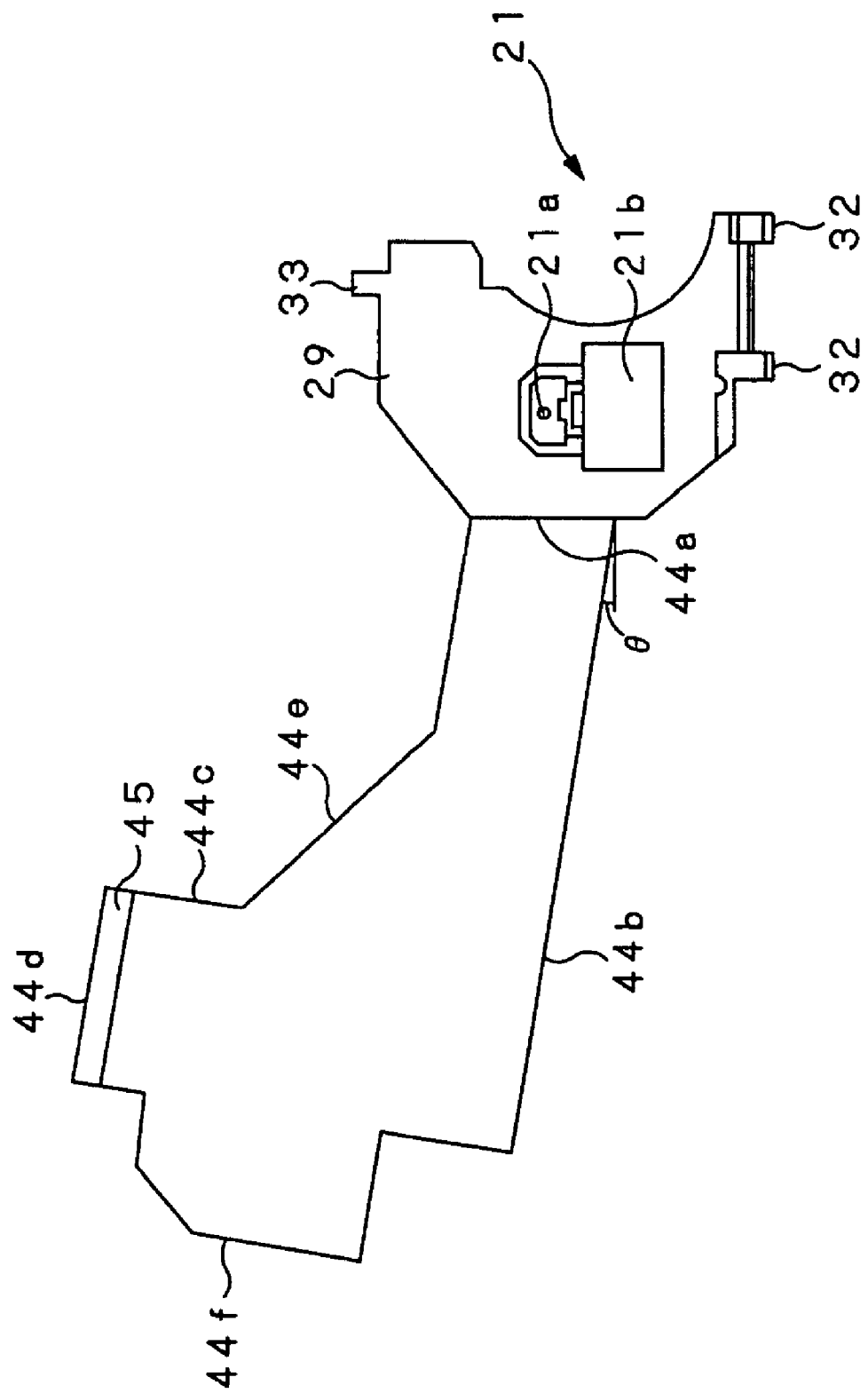
FIG. 16 is a schematic plan view of the optical pickup and the FPC of FIG. 13, showing how the FPC is fitted to the former differently from FIG. 13.

More specifically, as shown in FIG. 16, the FPC 44 may be connected at the end 44a thereof to the lateral surface of the outer periphery of the optical pickup 21 in a state where it is inclined toward the side opposite to the side where the objective lens drive mechanism 21b is arranged by an angle of θ relative to the straight line that passes through the objective lens 21a of the optical pickup 21 and runs in parallel with the feeding direction the optical pickup 21.

Figure 17:
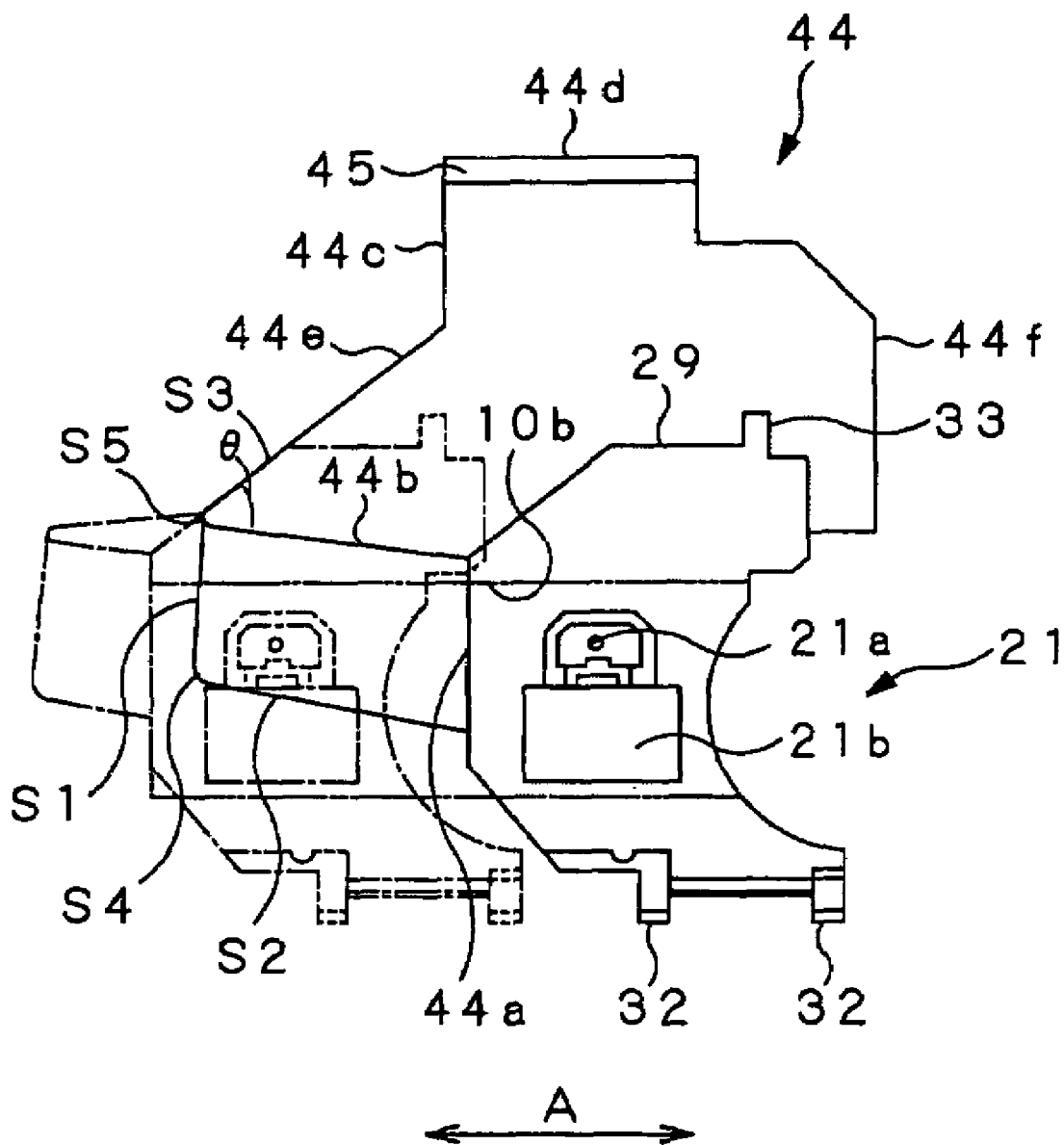
FIG. 17 is a schematic plan view of the optical pickup and the FPC of FIG. 16, showing how the FPC displaces its folded position as it follows the movement of the optical pickup that is being fed.

As a result, as indicated by solid lines in FIG. 17, the FPC 44 is folded toward the bottom surface side of the optical pickup 21 to show a V-shaped profile in such a way that the wiring section S3 connected to the circuit substrate 39 and running in the intra-surface direction of the base 16 is made to show an angle of θ relative to the wiring section S2 connected to the optical pickup 21 with the folded position S1 interposed between them and the wiring section S2 is located at the side of the aperture 10b of the top cover 10 relative to the wiring section S3 that runs substantially in parallel with the feeding direction of the optical pickup 21.

With this arrangement, when the optical pickup 21 is located at the innermost position along the feeding direction A of the optical pickup 21, as indicated by solid lines in FIG. 17, it is possible to place the lateral edge section that rises more toward the side of the top cover at the folded position S1, or the lateral edge section S5 of the FPC 44 at the folded position S1, below the top cover 10.

As the optical pickup 21 is driven to move and is fed from the above position to the outmost position along the feeding direction A of the optical pickup 21, as indicated by broken lines in FIG. 17, the FPC 44 follows the movement of the optical pickup 21 that is being fed, and consequently the folded position S1 thereof is displaced. At this time, it is possible to place the lateral edge section that rises more toward the side of the top cover at the folded position S1, or the lateral edge section S5 of the FPC 44 at the folded position S1, below the top cover 10, while the FPC 44 keeps on being folded toward the bottom surface side of the optical pickup 21 in such a way that the wiring section S3 connected to the circuit substrate 39 and running in the intra-surface direction of the base 16 is made to show an angle of θ relative to the wiring section S2 connected to the optical pickup 21 with the folded position S1 interposed between them.

Thus, in this case again, the disc drive apparatus 1 of this embodiment can be structured in such a way that, when the optical pickup 21 is driven to move and is fed in a radial direction of the optical disc 2, the top cover 10 can hold down the lateral edge section S5 that is located opposite to and raised more than the lateral edge section S4 that is exposed to the outside through the aperture 10b of the top cover 10 at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section S4 of the FPC 44 that rises less toward the side of the top cover at the folded position S1.

Figure 18:
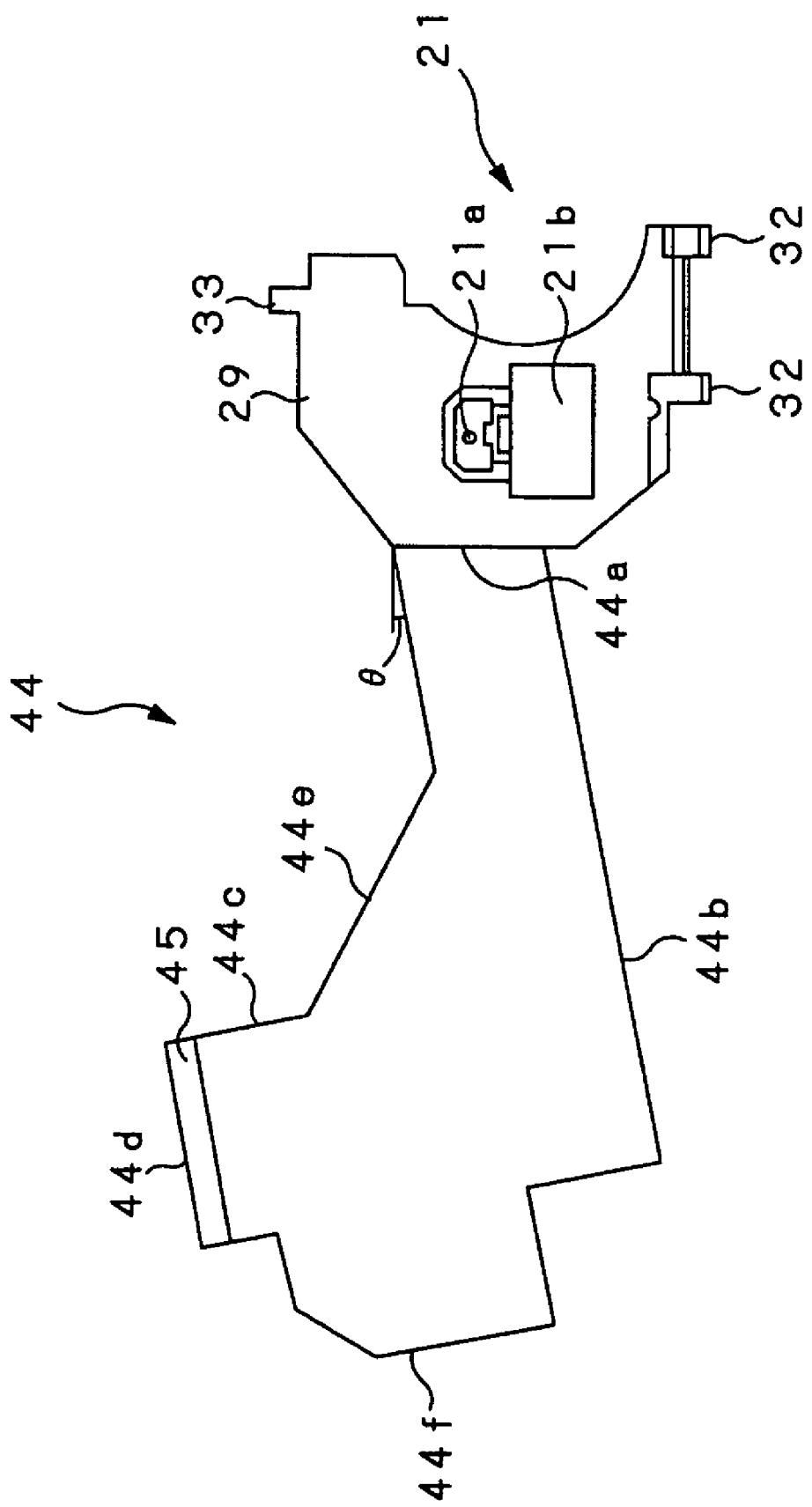
FIG. 18 is a schematic plan view of the optical pickup and the FPC of FIG. 13, showing how the latter is fitted to the former differently from FIGS. 13 and 16.
Figure 19:
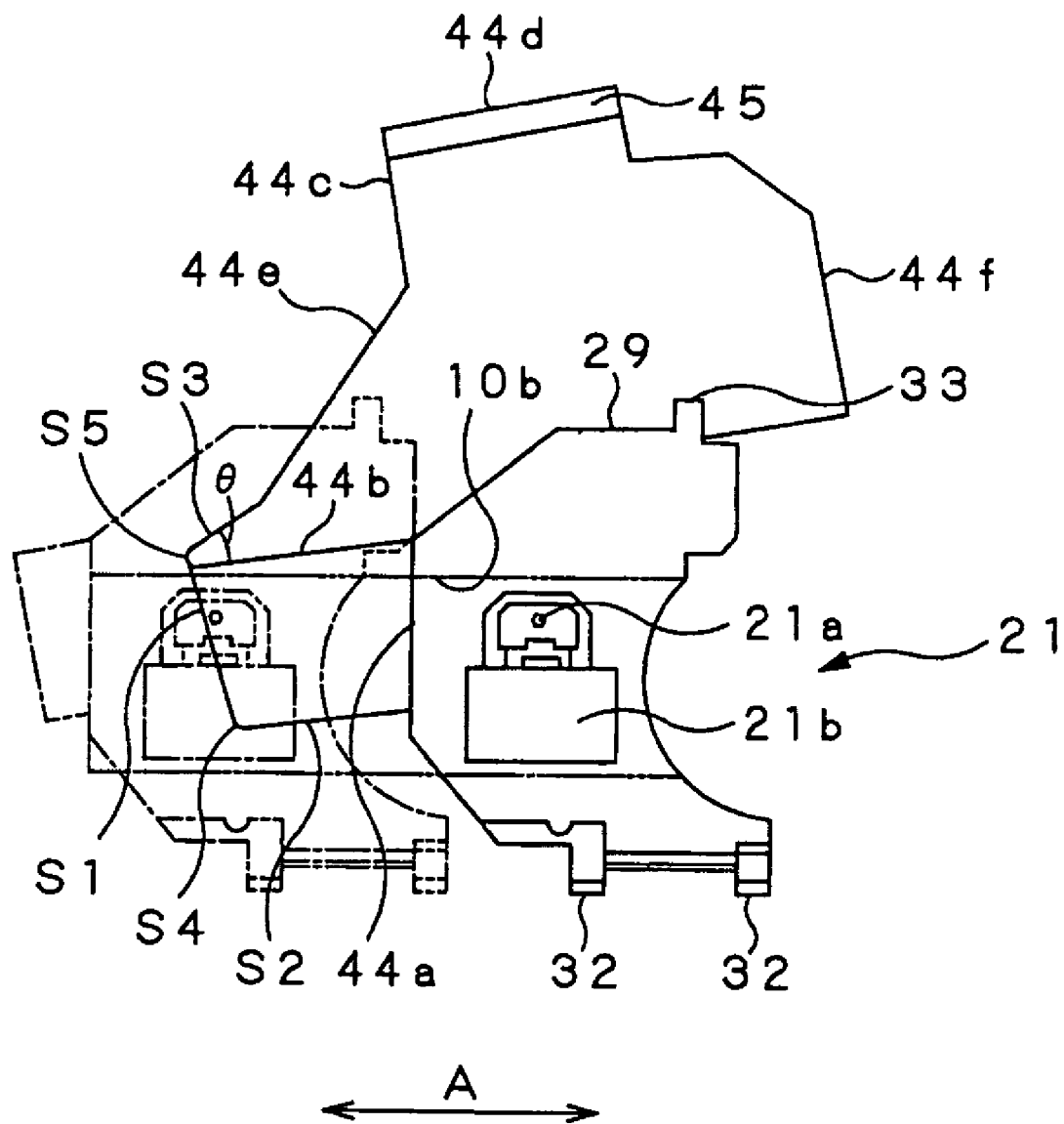
FIG. 19 is a schematic plan view of the optical pickup and the FPC of FIG. 18, showing how the FPC displaces its folded position as it follows the movement of the optical pickup that is being fed.

Still alternatively, in the disc drive apparatus 1 of this embodiment, the FPC 44 may be arranged obliquely relative to the feeding direction of the optical pickup 21 but oppositely relative to the FPC 44 of FIGS. 16 and 17, as shown in FIGS. 18 and 19.

More specifically, as shown in FIG. 18, the FPC 44 may be connected at the end 44a thereof to the lateral surface of the outer periphery of the optical pickup 21 in a state where it is inclined toward the side where the objective lens drive mechanism 21b is arranged by an angle of θ relative to the straight line that passes through the objective lens 21a of the optical pickup 21 and runs in parallel with the feeding direction the optical pickup 21.

As a result, as indicated by solid lines in FIG. 19, the FPC 44 is folded toward the bottom surface side of the optical pickup 21 to show a V-shaped profile in such a way that the wiring section S3 connected to the circuit substrate 39 and running in the intra-surface direction of the base 16 is made to show an angle of θ relative to the wiring section S2 connected to the optical pickup 21 with the folded position S1 interposed between them and the wiring section S2 is located at the side of the aperture 10b of the top cover 10 relative to the wiring section S3 that runs substantially in parallel with the feeding direction of the optical pickup 21.

With this arrangement, when the optical pickup 21 is located at the innermost position along the feeding direction A of the optical pickup 21 as indicated by solid lines in FIG. 19, it is possible to place the lateral edge section that rises more toward the side of the top cover at the folded position S1, or the lateral edge section S5 of the FPC 44 at the folded position S1, below the top cover 10.

As the optical pickup 21 is driven to move and is fed from the above position to the outmost position along the feeding direction A of the optical pickup 21 as indicated by broken lines in FIG. 19, the FPC 44 follows the movement of the optical pickup 21 that is being fed and consequently the folded position S1 thereof is displaced. At this time, it is possible to place the lateral edge sections S4 and S5 at the folded position S1 of the FPC 44, below the top cover 10, while the wiring section S3 connected to the circuit substrate 39 is substantially held in parallel with the wiring section S2 connected to the optical pickup 21 with the folded position S1 interposed between them.

Thus, in this case again, the disc drive apparatus 1 of this embodiment can be structured in such a way that, when the optical pickup 21 is driven to move and is fed in a radial direction of the optical disc 2, the top cover 10 can hold down the lateral edge section S5 that is located opposite to and raised more than the lateral edge section S4 that is exposed to the outside through the aperture 10b of the top cover 10 at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section S4 of the FPC 44 that rises less toward the side of the top cover at the folded position S1.

Figure 20A:
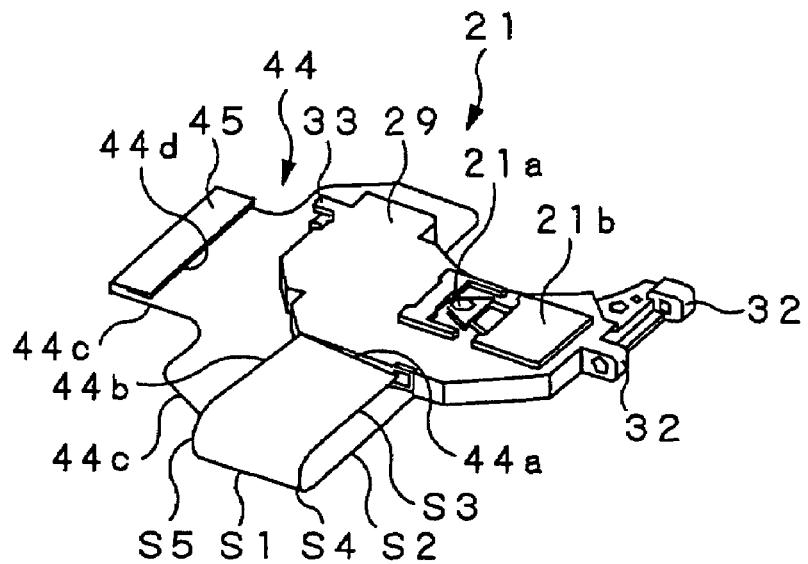
FIGS. 20A through 20C are schematic illustrations of the optical pickup and the FPC of FIG. 13, showing how the FPC is fitted to the former differently from FIGS. 13, 16 and 18.
Figure 20B:
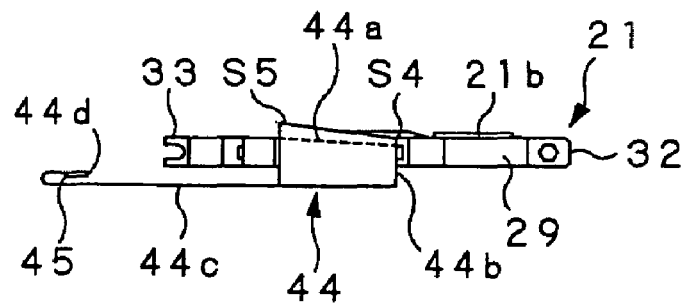
Figure 20C:
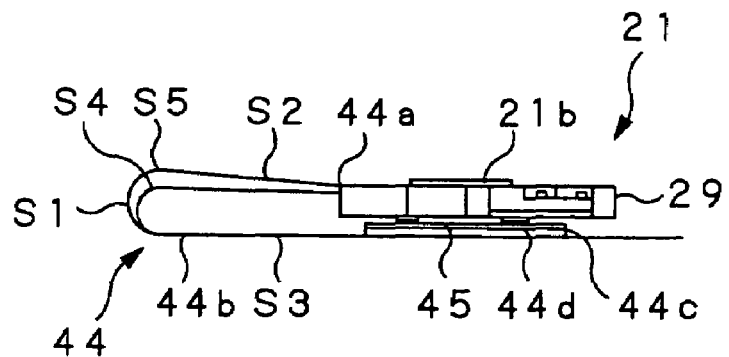

Still alternatively, in the disc drive apparatus 1 of this embodiment, the FPC 44 may be arranged in such a way that the end 44a thereof is connected to the lateral surface of the outer periphery of the optical pickup 21 while the lateral edge section S5 is held higher toward the side of the top cover 10 than the lateral edge section S4 that is oppositely-disposed relative to the lateral edge section S5 and exposed to the outside through the aperture 10b of the top cover 10 as shown in FIGS. 20A through 20C.

Figure 21:
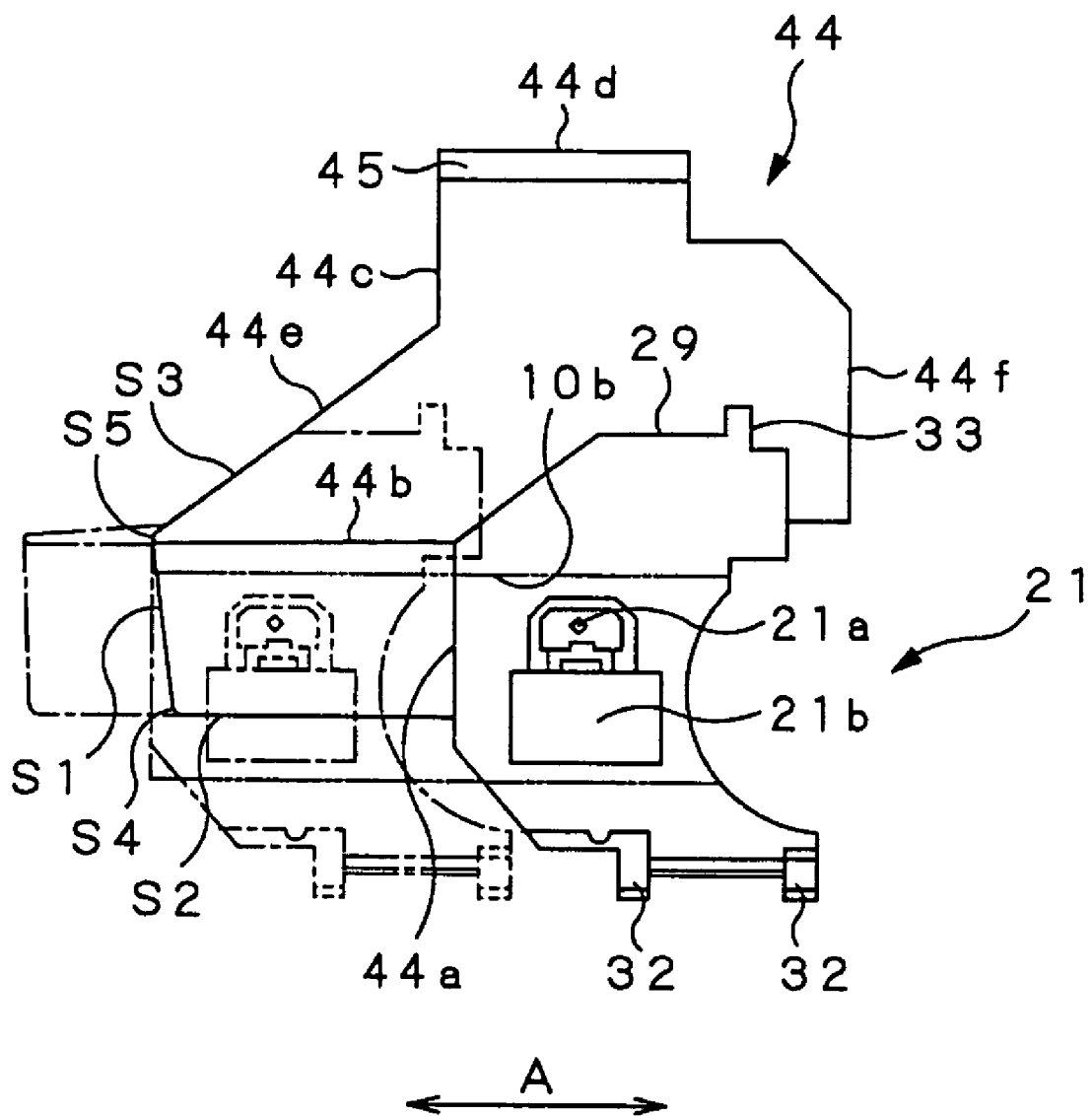
FIG. 21 is a schematic plan view of the optical pickup and the FPC of FIGS. 20A through 20C, showing how the FPC displaces its folded position as it follows the movement of the optical pickup that is being fed.

Then, the lateral edge section S5 can be made to rise higher toward the top cover 10 than the lateral edge section S4 at the folded position S1 of the FPC 44 when the FPC 44 is folded toward the bottom surface side of the optical pickup 21 in such a way that the wiring section S3 connected to the circuit substrate 39 is substantially held in parallel with the wiring section S2 connected to the optical pickup 21 with the folded position S1 interposed between them as shown in FIG. 21.

With this arrangement, when the optical pickup 21 is located at the innermost position along the feeding direction A of the optical pickup 21 as indicated by solid lines in FIG. 21, it is possible to place the lateral edge section that rises more toward the side of the top cover at the folded position S1, or the lateral edge section S5 of the FPC 44 at the folded position S1, below the top cover 10.

As the optical pickup 21 is driven to move and is fed from the above position to the outermost position along the feeding direction A of the optical pickup 21 as indicated by broken lines in FIG. 15, the FPC 44 follows the movement of the optical pickup 21 that is being fed and consequently the folded position S1 thereof is displaced. At this time, it is possible to place the lateral edge section that rises more toward the side of the top cover at the folded position S1, or the lateral edge section S5 of the FPC 44 at the folded position S1, below the top cover 10, while the wiring section S3 connected to the circuit substrate 39 is substantially held in parallel with the wiring section S2 connected to the optical pickup 21 with the folded position S1 of the FPC 44 interposed between them.

Thus, in this case again, the disc drive apparatus 1 of this embodiment can be structured in such a way that, when the optical pickup 21 is driven to move and is fed in a radial direction of the optical disc 2, the top cover 10 can hold down the lateral edge section S5 that is located opposite to and raised more than the lateral edge section S4 that is exposed to the outside through the aperture 10b of the top cover 10 at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section S4 of the FPC 44 that rises less toward the side of the top cover at the folded position S1.

As described above in detail, in the disc drive apparatus 1 of this embodiment, as the FPC 44 follows the movement of the optical pickup 21 that is being fed and consequently the folded position S1 thereof is displaced, the top cover 10 can hold down the lateral edge section that is raised more at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section of the FPC 44 that rises less toward the side of the top cover at the folded position S1.

Thus, in the disc drive apparatus 1 of this embodiment, it is possible to prevent the part of the FPC 44 that cannot be covered by the top cover 10 from being extruded to the outside through the aperture 10b of the top cover 10 if the folded part of the FPC 44 is forced to show a very low profile between the top cover 10 and the bottom cover 11 as a result of making the apparatus main body show a low profile or the FPC 44 is inevitably made to show a high profile because of an increased number of wires. Then, the FPC 44 is prevented from contacting the signal recording surface of the optical disc 2 while the optical pickup 21 is driven to move and fed in a radial direction of the optical disc 2 so that it is possible for the optical pickup 21 to properly write a signal on and/or read a signal from the optical disc 2.

Additionally, it is possible for the disc drive apparatus 1 of this embodiment according to the present invention to further make the entire disc drive apparatus show a low profile if the FPC 44 is inevitably made to show a high profile.

Figure 22:
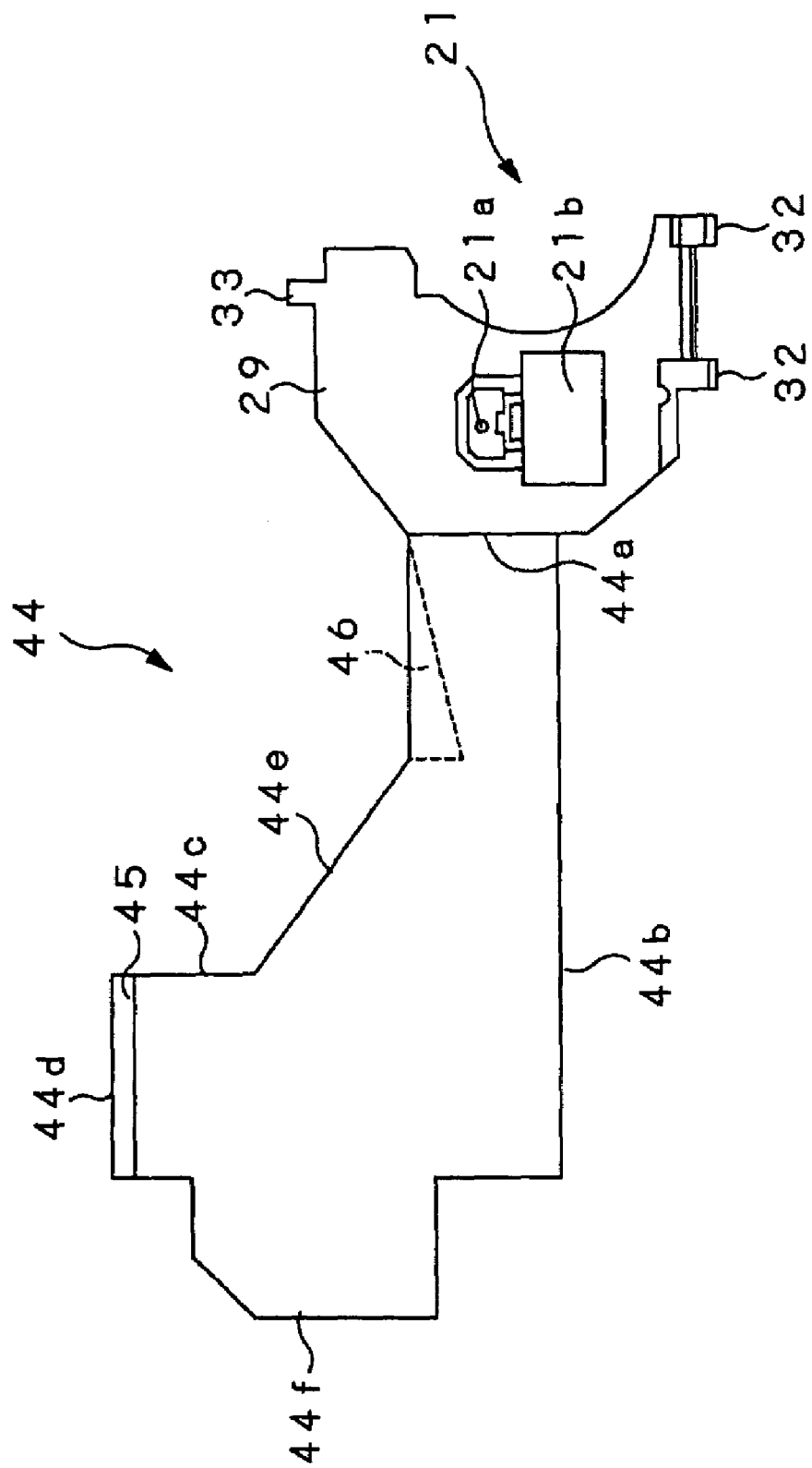
FIG. 22 is a schematic plan view of the optical pickup and the FPC similar to FIG. 13 but a reinforcement member is fitted to the FPC.
Figure 23:
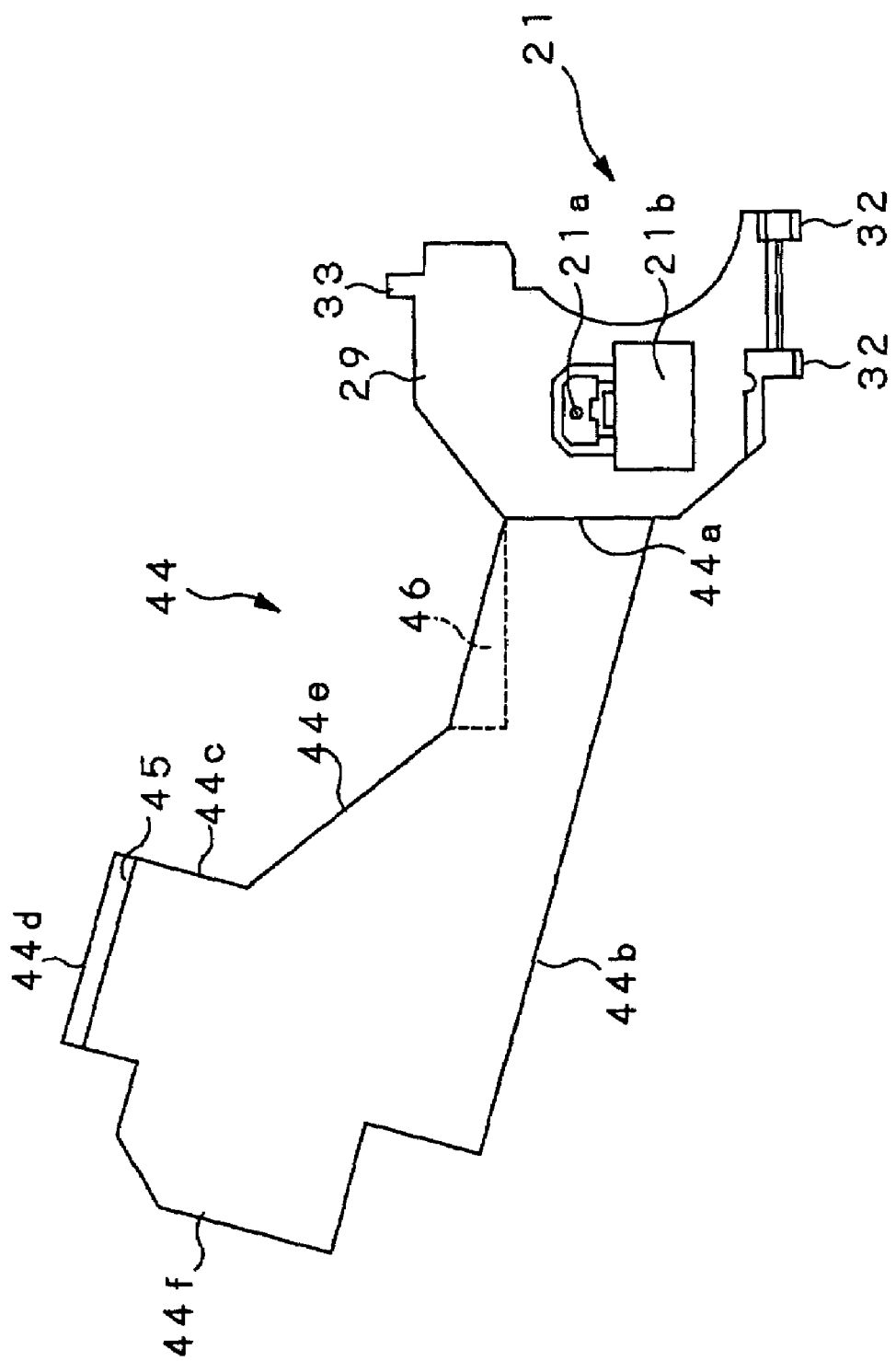
FIG. 23 is a schematic plan view of the optical pickup and the FPC similar to FIG. 16 but a reinforcement member is fitted to the FPC.
Figure 24:
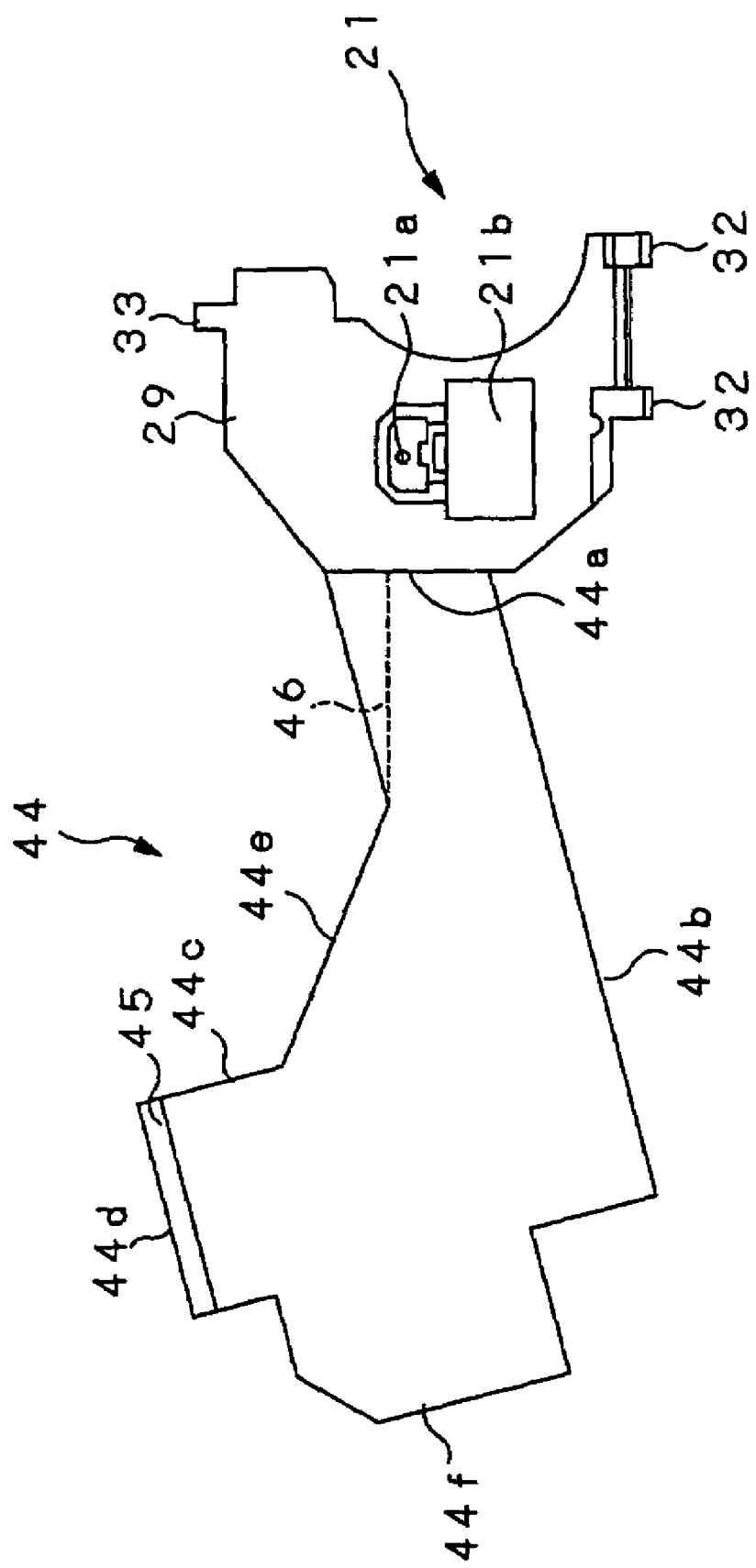
FIG. 24 is a schematic plan view of the optical pickup and the FPC similar to FIG. 18 but a reinforcement member is fitted to the FPC.

The disc drive apparatus 1 of this embodiment is not limited to the above described structure where the top cover 10 holds down the lateral edge section that rises more toward the top cover 10 than the opposite lateral edge section at the folded position S1 of the FPC 44. For example, a reinforcement member 46 may be fitted to the FPC 44 at the side thereof that rises to a large extent toward the top cover at the folded position S1 of the FPC 44 as shown in FIGS. 22, 23 and 24.

The reinforcement member 46 is a flexible reinforcement plate that is bonded to the inner main surface of the FPC 44. As described above by referring to FIGS. 15, 17 and 19, the lateral edge section S5 rises more toward the top cover 10 than the lateral edge section S4 at the folded position S1 of the FPC 44 when the FPC 44 follows the movement of the optical pickup 21 that is being fed and consequently the folded position S1 thereof is displaced. Therefore, the reinforcement member 46 holds down the lateral edge section S5 that rises to a large extent by means of its rigidity.

Since the reinforcement member 46 suppresses the FPC 44 that rises up toward the top cover 10 when the optical pickup 21 is driven to move and is fed in a radial direction of the optical disc 2, it is possible to prevent the part of the FPC 44 that cannot be covered by the top cover 10 from being extruded to the outside through the aperture 10b of the top cover 10 without holding down the side of the FPC 44 that rises more by means of the top cover 10.

While the FPC 44 is extended from the lateral side of the optical pickup 21 located at the side of the outer periphery of the optical pickup 21 in the above described disc drive apparatus 1 of this embodiment, alternatively, the FPC 44 may be extended from the lateral side of the optical pickup 21 located at the side of the inner periphery of the optical pickup 21.

In this case again, as the FPC 44 follows the movement of the optical pickup 21 that is being fed and consequently the folded position S1 thereof is displaced, the top cover 10 is made to hold down the lateral edge section that is raised more at least at the folded position S1 out of the lateral edge sections S4, S5 of the FPC 44 as viewed in the longitudinal direction of the FPC 44. In other words, it is possible to prevent the part of the FPC 44 that cannot be covered by the top cover 10 from being extruded to the outside through the aperture 10b of the top cover 10 by exposing the lateral edge section of the FPC 44 that rises less toward the side of the top cover at the folded position S1.

The present invention is applicable not only to a tray-type disc drive apparatus 1 as described above but also to a slot-in-type disc drive apparatus having a disc inlet/outlet port arranged at the front side of the cabinet of the apparatus through which an optical disc is moved into and away from the apparatus.

Additionally, the present invention is applicable not only to a disc drive apparatus designed to be used with an optical disc but also to a disc drive apparatus designed to be used with a magneto-optical disc or a disc cartridge containing an optical disc on which information signals are recorded and/or from which signals are reproduced.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus comprising:
   a cabinet;
   a disc drive unit contained in the cabinet; and
   a circuit substrate carrying a drive control circuit for controlling the operation of driving the disc drive unit;
   the disc drive unit including:
   a disc rotary drive mechanism having a turntable for receiving an optical disc and a spindle motor for driving the optical disc placed on the turntable to rotate;
   an optical pickup for writing a signal on and/or reading a signal from the optical disc, irradiating the signal recording surface of the optical disc being driven to rotate by the disc rotary drive mechanism with a light beam converged by an objective lens;
   a pickup feed mechanism having a guide shaft for supporting the optical pickup so as to allow it to slide in a radial direction of the optical disc and adapted to feed the optical pickup in the radial direction of the optical disc;
   a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof;
   a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and
   a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc;

the disc drive unit being structurally so adapted as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

2. The apparatus according to claim 1, wherein the top cover holds down the lateral edge section of the flexible printed circuit board as viewed in the longitudinal direction of the flexible printed circuit board that rises to a greater extent at least at the folded position.

3. The apparatus according to claim 2, wherein the wiring section of the flexible printed circuit board that is connected to the circuit substrate is folded toward the bottom surface side of the optical pickup from the wiring section that is connected to the optical pickup with the folding position of the flexible printed circuit board interposed between them with an angle relative to the intra-surface direction of the base and, at the same time, the wiring section that is connected to the optical pickup is located at a position closer to the aperture of the top cover than the wiring section that is connected to the circuit substrate when the flexible printed circuit board follows the movement of the optical pickup that is being fed and the folded position thereof is displaced so that the top cover holds down the lateral edge section of the flexible printed circuit board as opposed to the lateral edge section exposed to the aperture of the top cover at least at the folded position out of the lateral edge sections of the flexible printed circuit board as viewed in the longitudinal direction of the latter.

4. The apparatus according to claim 3, wherein the flexible printed circuit board is arranged obliquely relative to the direction in which the optical pickup is fed.

5. The apparatus according to claim 2, wherein the flexible printed circuit board is connected at an end thereof to the optical pickup in a state where the lateral edge section as opposed to the lateral edge section exposed to the aperture of the top cover is inclined toward the top cover.

6. The apparatus according to claim 1, wherein the flexible printed circuit board is provided with a reinforcement member along the lateral edge section thereof as viewed in the longitudinal direction that rises toward the top cover to a greater extent at least at the folded position in order to hold down the lateral edge section.

7. The apparatus according to claim 1, further comprising:
a disc tray adapted to be moved into and moved out of the cabinet through a tray inlet/outlet port arranged at the front side of the cabinet, the disc drive unit and the circuit substrate being fitted to one of the surfaces thereof, a disc holding recess having a profile corresponding to that of the optical disc and an aperture for exposing the disc drive unit to the outside through the bottom surface section of the disc holding recess being formed on the other surface thereof; and
a bottom cover fitted to the one of the surfaces of the disc tray;
the flexible printed circuit board being sandwiched between the top cover and the bottom cover and arranged between the optical pickup and the circuit substrate.

8. A disc drive unit comprising:
a disc rotary drive mechanism having a turntable for receiving an optical disc and a spindle motor for driving the optical disc placed on the turntable to rotate;
an optical pickup for writing a signal on and/or reading a signal from the optical disc, irradiating the signal recording surface of the optical disc being driven to rotate by the disc rotary drive mechanism with a light beam converged by an objective lens;
a pickup feed mechanism having a guide shaft for supporting the optical pickup so as to allow it to slide in a radial direction of the optical disc and adapted to feed the optical pickup in the radial direction of the optical disc;
a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof;
a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and
a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc;
the disc drive unit being structurally so adapted as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

9. An optical pickup device comprising:
an optical pickup for writing a signal on and/or reading a signal from the optical disc, irradiating the signal recording surface of the optical disc being driven to rotate with a light beam converged by an objective lens; and
a flexible printed circuit board connected at an end thereof to the optical pickup and at the other end to the circuit substrate, the other end being folded toward the bottom surface section of the optical pickup, and adapted to displace the folded position thereof, following the movement of the optical pickup being fed; and
mounted in a disc drive unit including:
a disc rotary drive mechanism having a turntable for receiving an optical disc and a spindle motor for driving the optical disc placed on the turntable to rotate;
a pickup feed mechanism having a guide shaft for supporting the optical pickup so as to allow it to slide in a radial direction of the optical disc and adapted to feed the optical pickup in the radial direction of the optical disc;
a base carrying the spindle motor and the guide shaft on one of the surfaces thereof, the spindle motor and the opposite ends of the guide shaft fitted thereto, and having an aperture formed to expose the turntable and the optical pickup to the outside from the other surface thereof; and
a top cover fitted to the other surface of the base so as to hold down the flexible printed circuit board exposed to the outside through the aperture of the base and having an aperture for exposing the objective lens of the optical pickup to the outside, the optical pickup being fed in the radial direction of the optical disc;

the optical pickup device being structurally so adapted as to hold down the lateral edge section of the flexible printed circuit board rising to a greater extent than the other lateral edge section as viewed in the longitudinal direction thereof at least at the folded position thereof while the flexible printed circuit board displaces the folded position, following the movement of the optical pickup being fed.

* * * * *